(12) United States Patent
Li et al.

(10) Patent No.: US 11,480,435 B2
(45) Date of Patent: Oct. 25, 2022

(54) MAP GENERATION SYSTEMS AND METHODS

(71) Applicant: SZ DJI TECHNOLOGY CO., LTD., Shenzhen (CN)

(72) Inventors: Wei Li, Shenzhen (CN); Lu Ma, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 133 days.

(21) Appl. No.: 16/703,550

(22) Filed: Dec. 4, 2019

(65) Prior Publication Data

US 2020/0109954 A1 Apr. 9, 2020

Related U.S. Application Data

(63) Continuation of application No. PCT/CN2017/091225, filed on Jun. 30, 2017.

(51) Int. Cl.
*G01C 21/32* (2006.01)
*G05D 1/02* (2020.01)
*G08G 1/01* (2006.01)

(52) U.S. Cl.
CPC .......... *G01C 21/32* (2013.01); *G05D 1/0274* (2013.01); *G05D 1/0278* (2013.01); *G08G 1/0112* (2013.01); *G05D 2201/0213* (2013.01)

(58) Field of Classification Search
CPC .................. G01C 21/32; G01C 21/3804; G01C 21/3841; G05D 1/0274; G05D 1/0278; G05D 2201/0213; G05D 1/0291; G08G 1/0112; G06K 9/00791
See application file for complete search history.

(56) References Cited

U.S. PATENT DOCUMENTS

| | | | | |
|---|---|---|---|---|
| 5,155,684 A | * | 10/1992 | Burke | G05D 1/0221 318/587 |
| 9,612,123 B1 | * | 4/2017 | Levinson | B60W 30/09 |
| 2007/0014435 A1 | * | 1/2007 | Mirowski | G06K 9/6255 382/109 |
| 2014/0358436 A1 | | 12/2014 | Kim | |
| 2015/0057920 A1 | | 2/2015 | Von et al. | |
| 2015/0110344 A1 | | 4/2015 | Okumura | |
| 2015/0234045 A1 | * | 8/2015 | Rosenblum | G01S 13/86 342/71 |
| 2017/0031359 A1 | | 2/2017 | Shashua et al. | |
| 2017/0124476 A1 | | 5/2017 | Levinson et al. | |
| 2017/0178352 A1 | * | 6/2017 | Harmsen | G06T 17/05 |

(Continued)

FOREIGN PATENT DOCUMENTS

| | | |
|---|---|---|
| CN | 105823478 A | 8/2016 |
| WO | 2017021474 A1 | 2/2017 |

OTHER PUBLICATIONS

The World Intellectual Property Organization (WIPO) International Search Report and Written Opinion for PCT/CN2017/091225 dated Mar. 30, 2018 8 pages.

*Primary Examiner* — Rami Khatib
(74) *Attorney, Agent, or Firm* — Anova Law Group, PLLC

(57) ABSTRACT

A method of map generation includes receiving data from a plurality of vehicles about environments within which the plurality of vehicles operate, and generating a three-dimensional map using the data from the plurality of vehicles. The data is collected by one or more sensors on-board the plurality of vehicles.

20 Claims, 13 Drawing Sheets

(56) References Cited

U.S. PATENT DOCUMENTS

| | | | |
|---|---|---|---|
| 2018/0022356 A1* | 1/2018 | McBride | G05D 1/0231 340/439 |
| 2018/0129204 A1* | 5/2018 | Ricci | G08G 1/0133 |
| 2018/0349715 A1* | 12/2018 | Gupta | B60R 1/00 |
| 2019/0384294 A1* | 12/2019 | Shashua | G05D 1/0088 |

* cited by examiner

MAP GENERATION SYSTEMS AND METHODS

CROSS-REFERENCE TO RELATED APPLICATION

This application is a continuation of International Application No. PCT/CN2017/091225, filed on Jun. 30, 2017, the entire content of which is incorporated herein by reference.

BACKGROUND OF THE DISCLOSURE

Vehicles can be outfitted with various types of sensors to sense and navigate through an environment without (or with minimal) human intervention. These vehicles can detect a surrounding environment and enable autonomous navigation while moving around. Various types of sensors can be used to generate positional and motion information for control and navigation of the vehicle. During the navigation of the vehicle, a map can be used to guide the vehicle to a specified destination. However, traditional maps are less than ideal since they are often low precision, lack of details of the surrounding environment, and out of date. In some instances, the maps are less useful if the signals for locating and navigating the vehicle are not available or lost.

SUMMARY OF THE DISCLOSURE

A need exists for improved systems, vehicles and methods for generating a map. The map generated herein can be based on data collected by various types of sensors on-board a vehicle. The data can be related to environments within which the vehicles operate. The generated map can be updated in real time and therefore keep up to date. In some embodiments, the map can be used for accurately navigate the vehicle and information derived from the map can be shared among multiple vehicles. Therefore, even the vehicles that do not participate in such data collection can also benefit from the embodiments of the disclosure. In some embodiments, the map can be used for assisting the vehicle in performing operations, for example, obstacle avoidance, relocation, replanning of the route or the like.

The map herein can be a three-dimensional map or a two-dimensional map.

Data for generating the map can be image data or video data of the surrounding environment, or location data of the vehicle collected by the multiple sensors. The data can be collected continuously or on a regular basis according to user's preferences. The data can be processed or pre-processed by one or more processors on-board the vehicle. The one or more processors herein may be separate processors connected with a controller of the vehicle or processors on-board the one or more sensors. The data processing or pre-processing herein may include but is not limited to image collection, image recognition, feature extraction, feature match or data encapsulation.

The data associated with the map as discussed above can be transmitted to one or more processors off-board the vehicle for map generation. To improve the transmission throughput or efficiency, a high speed transmission network can be used, for example, a fourth Generation (4G) network. The one or more processors off-board the vehicle can be located at a remote server, for example, a cloud server with cloud computing infrastructure. Upon receipt of the data collected by the vehicles, the remote server can build a high-precision map or update an existing high-precision map. In some embodiments, the remote server can generate calibration data for the vehicles based on the collected data and transmit the calibration data to the vehicle via the high speed network. Thereby, the vehicles can apply the calibration data for calibrating its current location or adjusting data related to a local map being used by the vehicle. Further, the calibration data can be used for locating or adjusting the location or direction of the one or more sensors on-board the vehicles. In some instances, the data useful for navigation can be transmitted among the plurality of vehicles. Thereby, the vehicles that are not capable of collecting data or do not participate in the data collection can also benefit from the high-precision map and achieve a great user experience for the users. In some instances, when the vehicles are autonomous vehicles, the data derived from the high-precision map (or high-precision map related data) can also be used for guiding them to a specified destination at a low cost, for example, through a possible shortest path and avoiding emergency scene. In some embodiments, instead of providing map related data to the vehicle, the map can be provided to a third party for scene simulation or 3D modeling.

Aspects of the disclosure are directed to a method of map generation. The method may comprise receiving data from a plurality of vehicles about environments within which the plurality of vehicles operate, wherein the data is collected by one or more sensors on-board the plurality of vehicles; and generating, with aid of one or more processors, a three-dimensional map using the data from the plurality of vehicles.

In some embodiments, the plurality of vehicles may comprise one or more unmanned ground vehicles or unmanned aerial vehicles.

In some embodiments, said method may further comprise providing information useful for navigation to at least one vehicle of the plurality of vehicles, wherein the information is derived from the three-dimensional map.

In some embodiments, the information useful for navigation may comprise a subset of the three-dimensional map comprising an environment within which the at least one vehicle is operating.

In some embodiments, the at least one vehicle may be configured to use the subset of the three-dimensional map as a local map to navigate within the environment.

In some embodiments, the information useful for navigation may comprise at least one command.

In some embodiments, the at least one command may comprise one or more navigational commands for the at least one vehicle to follow.

In some embodiments, the information useful for navigation may be used by the at least one vehicle to autonomously travel to a specified destination.

In some embodiments, the method may further comprise modifying a route of at least one vehicle of the plurality of vehicles to a specified destination based on the collected data or provided on the three-dimensional map.

In some embodiments, the method may further comprise modifying the specified destination while the at least one vehicle is en route to the specified destination.

In some embodiments, the three-dimensional map may be generated with aid of a cloud server.

In some embodiments, the three-dimensional map may be stored in memory using cloud computing infrastructure.

In some embodiments, the three-dimensional map may comprise traffic signs, traffic lights, billboards, roads, lane lines, pedestrian walkways, or structure.

In some embodiments, the three-dimensional map may comprise point cloud data.

In some embodiments, the method may further comprise projecting the point cloud data to a world coordinate system.

In some embodiments, the three-dimensional map may further comprise image data collected by the plurality of vehicles.

In some embodiments, the three-dimensional map may be used by at least one of the plurality of vehicles to calibrate a route while the vehicle is en route to a specified destination.

In some embodiments, the three-dimensional map may be used for locating at least one of the plurality of vehicles.

In some embodiments, the three-dimensional map may be used by at least one of the plurality of vehicles to calibrate its current location while the vehicle is en route to a specified destination.

In some embodiments, the three-dimensional map may be used by at least one of the plurality of vehicles to update a local map used by the at least one vehicle.

In some embodiments, the three-dimensional map may be used by a mobile robot for navigation.

In some embodiments, the three-dimensional map may be used for building a three-dimensional map model of a large-scale scene.

In some embodiments, the three-dimensional map may be used for building a three-dimensional scene.

In some embodiments, the three-dimensional scene may comprise a simulation scene or a game scene.

In some embodiments, the method may further comprise associating a confidence measure to the data that is used for generating a portion of the three-dimensional map.

In some embodiments, the method may further comprise determining a degree of similarity between the data provided by one or more vehicles of the plurality of vehicles for generating the portion of the three-dimensional map.

In some embodiments, the method may further comprise determining whether any of the one or more vehicles that provide dissimilar data has a vehicle positioning error.

In some embodiments, the vehicle positioning error may be detected based on reliability of Global Position System (GPS) information.

In some embodiments, the method may further comprise discarding the dissimilar data that is provided by the vehicle having the vehicle positioning error.

In some embodiments, the method may further comprise using the dissimilar data for generating a portion of the three-dimensional map associated with a correct position of the vehicle after the vehicle positioning error of the vehicle is addressed.

In some embodiments, the method may further comprise providing a higher confidence measure to similar data and providing a lower confidence measure to dissimilar data.

In some embodiments, the method may further comprise selecting data with a highest confidence measure for generating the portion of the three-dimensional map.

In some embodiments, data with a lowest confidence measure may be not used for generating the portion of the three-dimensional map.

In some embodiments, the method may further comprise generating calibration information for calibrating locations of the vehicles based on the data and providing the calibration information to the plurality of vehicles.

In some embodiments, the method may further comprise storing the data for updating a prior three-dimensional map on a regular basis.

In some embodiments, the data collected by the one or more sensors may comprise label information associated with a plurality of objects in the map.

In some embodiments, the label information may comprise class information and/or motion information associated with the plurality of objects in the three-dimensional map.

In some embodiments, the plurality of objects may comprise dynamic objects and/or static objects.

In some embodiments, the label information about the dynamic objects may be used for obstacle avoidance by at least one vehicle.

In some embodiments, the label information about the dynamic objects may not be relied upon for navigation of at least one vehicle.

In some embodiments, the label information about the static objects may be used for navigation of the at least one vehicle or used for obstacle avoidance.

In some embodiments, the plurality of objects may comprise permanent objects and temporary objects.

In some embodiments, the permanent objects may comprise traffic signs, traffic lights, roadlocks, or structures.

In some embodiments, the temporary objects may comprise construction, repair, parked cars, or accidents.

In some embodiments, the label information about the permanent objects may be used for navigation of the at least one vehicle.

In some embodiments, the label information about the temporary objects may be used for navigation of the at least one vehicle.

In some embodiments, the label information about the temporary objects may be used for a limited length of time from the detection of the temporary objects for navigation of the at least one vehicle.

In some embodiments, the label information about the temporary objects may not be relied upon for navigation of the at least one vehicle.

In some embodiments, the data from the plurality of vehicles may be provided via a high-speed transmission network.

Further aspects of the disclosure are directed to a system of generating a map. Said system may comprise one or more communication units configured to receive data from a plurality of vehicles about environments within which the plurality of vehicles operate, wherein the data is collected by one or more sensors on-board the plurality of vehicles; and one or more processors configured to generate a three-dimensional map using the data from the plurality of vehicles.

In some embodiments, the plurality of vehicles may comprise one or more unmanned ground vehicles or unmanned aerial vehicles.

In some embodiments, the one or more processors may be configured to provide information useful for navigation to at least one vehicle of the plurality of vehicles, wherein the information is derived from the three-dimensional map.

In some embodiments, the information useful for navigation may comprise a subset of the three-dimensional map comprising an environment within which the at least one vehicle is operating.

In some embodiments, the subset of the three-dimensional map may be used by a local map of the at least one vehicle to navigate within the environment.

In some embodiments, the information useful for navigation may comprise at least one command.

In some embodiments, the at least one command may comprise one or more navigational commands for the at least one vehicle to follow.

In some embodiments, the information useful for navigation may be used by the at least one vehicle to autonomously travel to a specified destination.

In some embodiments, the one or more navigational commands may be used for modifying a route of at least one vehicle of the plurality of vehicles to a specified destination.

In some embodiments, the one or more navigational commands may be used for modifying the specified destination while the at least one vehicle is en route to the specified destination.

In some embodiments, the three-dimensional map may be generated with aid of a cloud server.

In some embodiments, the three-dimensional map may be stored in memory using cloud computing infrastructure.

In some embodiments, the three-dimensional map may comprise traffic signs, traffic lights, billboards, roads, lane lines, pedestrian walkways, or structure.

In some embodiments, the three-dimensional map may comprise point cloud data.

In some embodiments, the one or more processors may further be configured to project the point cloud data to a world coordinate system.

In some embodiments, the three-dimensional map may further comprise image data collected by the plurality of vehicles.

In some embodiments, the three-dimensional map may be used by at least one of the plurality of vehicles to calibrate a route while the vehicle is en route to a specified destination.

In some embodiments, the three-dimensional map may be used for locating at least one of the plurality of vehicles.

In some embodiments, the three-dimensional map may be used by at least one of the plurality of vehicles to calibrate its current location while the vehicle is en route to a specified destination.

In some embodiments, the three-dimensional map may be used by at least one of the plurality of vehicles to update a local map used by the at least one vehicle.

In some embodiments, the three-dimensional map may be used by a mobile robot for navigation.

In some embodiments, the three-dimensional map may be used for building a three-dimensional map model of a large-scale scene.

In some embodiments, the three-dimensional map may be used for building a three-dimensional scene.

In some embodiments, the three-dimensional scene may comprise a simulation scene or a game scene.

In some embodiments, the one or more processors may further configured to associate a confidence measure to the data that is used for generating a portion of the three-dimensional map.

In some embodiments, the one or more processors may further be configured to determine a degree of similarity between the data provided by one or more vehicles of the plurality of vehicles for generating the portion of the three-dimensional map.

In some embodiments, the one or more processors may further be configured to determine whether any of the one or more vehicles that provide dissimilar data has a vehicle positioning error.

In some embodiments, the vehicle positioning error may be detected based on reliability of Global Position System (GPS) information.

In some embodiments, the one or more processors may further be configured to discard the dissimilar data that is provided by the vehicle having the vehicle positioning error.

In some embodiments, the one or more processors may be further configured to use the dissimilar data for generating a portion of the three-dimensional map associated with a correct position of the vehicle after the vehicle positioning error of the vehicle is addressed.

In some embodiments, the one or more processors may be further configured to provide a higher confidence measure to similar data and provide a lower confidence measure to dissimilar data.

In some embodiments, the one or more processors may be further configured to select data with a highest confidence measure for generating the portion of the three-dimensional map.

In some embodiments, the one or more processors may be further configured not to use data with a lowest confidence measure for generating the portion of the three-dimensional map.

In some embodiments, the one or more processors may be further configured to generate calibration information for calibrating locations of the vehicles based on the data and providing the calibration information to the plurality of vehicles.

In some embodiments, the method may further comprise storing the data for updating a prior three-dimensional map on a regular basis.

In some embodiments, the data collected by the one or more sensors may comprise label information associated with a plurality of objects in the map.

In some embodiments, the label information may comprise class information and/or motion information associated with the plurality of objects in the three-dimensional map.

In some embodiments, the plurality of objects may comprise dynamic objects and/or static objects.

In some embodiments, the label information about the dynamic objects may be used for obstacle avoidance by at least one vehicle.

In some embodiments, the label information about the dynamic objects may not be relied upon for navigation of at least one vehicle.

In some embodiments, the label information about the static objects may be used for navigation of the at least one vehicle or used for obstacle avoidance.

In some embodiments, the plurality of objects may comprise permanent objects and temporary objects.

In some embodiments, the permanent objects may comprise traffic signs, traffic lights, roadlocks, or structures.

In some embodiments, the temporary objects may comprise construction, repair, parked cars, or accidents.

In some embodiments, the label information about the permanent objects may be used for navigation of the at least one vehicle.

In some embodiments, the label information about the temporary objects may be used for navigation of the at least one vehicle.

In some embodiments, the label information about the temporary objects may be used for a limited length of time from the detection of the temporary objects for navigation of the at least one vehicle.

In some embodiments, the label information about the temporary objects may not be relied upon for navigation of the at least one vehicle.

In some embodiments, the data from the plurality of vehicles may be provided via a high-speed transmission network.

Additionally, aspects of the disclosure are directed to a method of facilitating generation of a three-dimensional map, said method comprising: collecting, with aid of one or more sensors on-board a vehicle, data about an environment within which the vehicle is operating; using the data for navigation of the vehicle; and transmitting the data to one or more processors off-board the vehicle, wherein the data is used by the one or more processors for generation of the three-dimensional map.

In some embodiments, the vehicle may comprise an unmanned ground vehicle or unmanned aerial vehicle.

In some embodiments, the method may further comprise receiving information useful for navigation from one or more processors off-board the vehicle, wherein the information is derived from the three-dimensional map.

In some embodiments, the information useful for navigation may comprise a subset of the three-dimensional map comprising an environment within which the vehicle is operating.

In some embodiments, the vehicle may be configured to use the subset of the three-dimensional map as a local map to navigate within the environment.

In some embodiments, the information useful for navigation may comprise at least one command.

In some embodiments, the at least one command may comprise one or more navigational commands for the vehicle to follow.

In some embodiments, the information useful for navigation may be used by the vehicle to autonomously travel to a specified destination.

In some embodiments, the method may further comprise modifying a route of the vehicle to a specified destination based on the collected data or provided on the three-dimensional map.

In some embodiments, the method may further comprise modifying the specified destination while the vehicle is en route to the specified destination.

In some embodiments, the vehicles may be capable of obstacle avoidance.

In some embodiments, the vehicle may be capable of obstacle avoidance with aid of one or more sensors on-board the vehicle.

In some embodiments, the vehicle may be capable of obstacle avoidance without requiring any information from the three-dimensional map.

In some embodiments, the vehicle may be capable of obstacle avoidance based on information from the three-dimensional map.

In some embodiments, the three-dimensional map may be generated with aid of a cloud server.

In some embodiments, the three-dimensional map may be stored in memory using cloud computing infrastructure.

In some embodiments, the three-dimensional map may comprise traffic signs, traffic lights, billboards, roads, lane lines, pedestrian walkways, or structure.

In some embodiments, the three-dimensional map may comprise point cloud data.

In some embodiments, the method may further comprise projecting the point cloud data to a world coordinate system.

In some embodiments, the three-dimensional map may further comprise image data collected with aid of the vehicle.

In some embodiments, the three-dimensional map may be used by the vehicle to calibrate a route while the vehicle is en route to a specified destination.

In some embodiments, the three-dimensional map may be used for locating the vehicle.

In some embodiments, the three-dimensional map may be used by the vehicle to calibrate its current location while the vehicle is en route to a specified destination.

In some embodiments, the three-dimensional map may be used by the vehicle to update a local map used by the vehicle.

In some embodiments, the three-dimensional map may be used by a mobile robot for navigation.

In some embodiments, the three-dimensional map may be used for building a three-dimensional map model of a large-scale scene.

In some embodiments, the three-dimensional map may be used for building a three-dimensional scene.

In some embodiments, the three-dimensional scene may comprise a simulation scene or a game scene.

In some embodiments, the data may be transmitted at a variable frequency, wherein the frequency depends on activity of the vehicle.

In some embodiments, the frequency may depend on a speed of the vehicle.

In some embodiments, a higher frequency may be provided for a higher speed of the vehicle.

In some embodiments, the frequency may depend on complexity of activity of the vehicle.

In some embodiments, a higher frequency may be provided for a greater complexity of activity of the vehicle.

In some embodiments, the data may be transmitted at a variable frequency, and the frequency may depend on data obtained from one or more other vehicles within proximity of the vehicle.

In some embodiments, a lower frequency may be provided for more data obtained from the one or more other vehicles.

In some embodiments, the frequency may depend on an assessed reliability of the data obtained from the one or more other vehicles within the proximity of the vehicle.

In some embodiments, a lower frequency may be provided for a greater assessed reliability of the data from the one or more other vehicles.

In some embodiments, the data may be transmitted at a variable frequency, and the frequency may depend on detection or location of one or more dynamic objects previously detected within proximity of the vehicle.

In some embodiments, the data may be transmitted on a regular basis.

In some embodiments, the method may comprise generating calibration information for calibrating locations of the vehicles based on the data.

In some embodiments, the one or more sensors may comprise lidar sensors, vision sensors, ultrasonic sensors, radar, or GPS sensors.

In some embodiments, the one or more sensors may comprise one or more cameras selected from a monocular camera, a binocular camera, and an omnidirectional camera, wherein a direction or location of one of the one or more cameras is determined using a visual odometer.

In some embodiments, the data collected by the one or more sensors may comprise real-time location information associated with the vehicle.

In some embodiments, the data collected by the one or more sensors may comprise label information associated with a plurality of objects in the three-dimensional map.

In some embodiments, the label information may comprise class information and/or motion information associated with the plurality of objects in the three-dimensional map.

In some embodiments, the plurality of objects may comprise dynamic objects and/or static objects.

In some embodiments, the label information about the dynamic objects may be used for obstacle avoidance by the vehicle.

In some embodiments, the label information about the dynamic objects may not be relied upon for navigation of the vehicle.

In some embodiments, the label information about the static objects may be used for navigation of the vehicle or used for obstacle avoidance.

In some embodiments, the plurality of objects may comprise permanent objects and temporary objects.

In some embodiments, the permanent objects may comprise traffic signs, traffic lights, roadlocks, or structures.

In some embodiments, the temporary objects may comprise construction, repair, parked cars, or accidents.

In some embodiments, the label information about the permanent objects may be used for navigation of the vehicle.

In some embodiments, the label information about the temporary objects may be used for navigation of the vehicle.

In some embodiments, the label information about the temporary objects may be used for a limited length of time from the detection of the temporary objects for navigation of the vehicle.

In some embodiments, the label information about the temporary objects may not be relied upon for navigation of the vehicle.

In some embodiments, the data may be transmitted from the vehicle via a high-speed transmission network.

In some embodiments, data derived from the three-dimensional map may be transmitted from the vehicle to one or more of a plurality of vehicles for facilitating at least one of navigation, map calibration, obstacle avoidance, or positioning of the one or more vehicles.

A vehicle of facilitating generation of a three-dimensional map may be provided in accordance with another aspect of the disclosure. The vehicle may comprise: one or more sensors configured to collect data about an environment within which the vehicle is operating; one or more processors configured to use the data for navigation of the vehicle; and one or more communication units configured to transmit the data to one or more processors off-board the vehicle, wherein the data is used by the one or more processors for generation of the three-dimensional map.

In some embodiments, the vehicle may comprise an unmanned ground vehicle or unmanned aerial vehicle.

In some embodiments, the one or more communication units may be configured to receive information useful for navigation from one or more processors off-board the vehicle, wherein the information is derived from the three-dimensional map.

In some embodiments, the information useful for navigation may comprise a subset of the three-dimensional map comprising an environment within which the vehicle is operating.

In some embodiments, the vehicle may be configured to use the subset of the three-dimensional map as a local map to navigate within the environment.

In some embodiments, the information useful for navigation may comprise at least one command.

In some embodiments, the at least one command may comprise one or more navigational commands for the vehicle to follow.

In some embodiments, the information useful for navigation may be used by the vehicle to autonomously travel to a specified destination.

In some embodiments, the one or more processors of the vehicle may be configured to modify a route of the vehicle to a specified destination based on the collected data or provided on the three-dimensional map.

In some embodiments, the one or more processors of the vehicle may be configured to modify a specified destination while the vehicle is en route to the specified destination.

In some embodiments, the vehicles may be capable of obstacle avoidance.

In some embodiments, the vehicle may be capable of obstacle avoidance with aid of the one or more sensors.

In some embodiments, the vehicle may be capable of obstacle avoidance without requiring any information from the three-dimensional map.

In some embodiments, the vehicle may be capable of obstacle avoidance based on information from the three-dimensional map.

In some embodiments, the three-dimensional map may be generated with aid of a cloud server.

In some embodiments, the three-dimensional map may be stored in memory using cloud computing infrastructure.

In some embodiments, the three-dimensional map may comprise traffic signs, traffic lights, billboards, roads, lane lines, pedestrian walkways, or structure.

In some embodiments, the three-dimensional map may be used by the vehicle to calibrate a route while the vehicle is en route to a specified destination.

In some embodiments, the three-dimensional map may be used for locating the vehicle.

In some embodiments, the three-dimensional map may be used by the vehicle to calibrate its current location while the vehicle is en route to a specified destination.

In some embodiments, the three-dimensional map may be used by the vehicle to update a local map used by the vehicle.

In some embodiments, the three-dimensional map may be used by a mobile robot for navigation.

In some embodiments, the three-dimensional map may be used for building a three-dimensional map model of a large-scale scene.

In some embodiments, the three-dimensional map may be used for building a three-dimensional scene.

In some embodiments, the three-dimensional scene may comprise a simulation scene or a game scene.

In some embodiments, the data may be transmitted at a variable frequency, wherein the frequency depends on activity of the vehicles.

In some embodiments, the frequency may depend on a speed of the vehicle.

In some embodiments, a higher frequency may be provided for a higher speed of the vehicle.

In some embodiments, the frequency may depend on complexity of activity of the vehicle.

In some embodiments, a higher frequency may be provided for a greater complexity of activity of the vehicle.

In some embodiments, the data may be transmitted at a variable frequency, and the frequency may depend on data obtained from one or more other vehicles within proximity of the vehicle.

In some embodiments, a lower frequency may be provided for more data obtained from the one or more other vehicles.

In some embodiments, the frequency may depend on an assessed reliability of the data obtained from the one or more other vehicles within the proximity of at least one vehicle.

In some embodiments, a lower frequency may be provided for a greater assessed reliability of the data from the one or more other vehicles.

In some embodiments, the data may be transmitted at a variable frequency, and the frequency may depend on detection or location of one or more dynamic objects previously detected within proximity of the vehicle.

In some embodiments, the data may be transmitted on a regular basis.

In some embodiments, the one or more processors of the vehicle may be configured to generate calibration information for calibrating a location of the vehicle based on the data.

In some embodiments, the one or more sensors may comprise lidar sensors, vision sensors, ultrasonic sensors, radar, or GPS sensors.

In some embodiments, the one or more sensors may comprise one or more cameras selected from a monocular camera, a binocular camera, and an omnidirectional camera, wherein a direction or location of one of the one or more cameras is determined using a visual odometer.

In some embodiments, the data collected by the one or more sensors may comprise real-time location information associated with the vehicle.

In some embodiments, the data collected by the one or more sensors may comprise label information associated with a plurality of objects in the three-dimensional map.

In some embodiments, the label information may comprise class information and/or motion information associated with the plurality of objects in the three-dimensional map.

In some embodiments, the plurality of objects may comprise dynamic objects and/or static objects.

In some embodiments, the label information about the dynamic objects may be used for obstacle avoidance by the vehicle.

In some embodiments, the label information about the dynamic objects may not be relied upon for navigation of the vehicle.

In some embodiments, the label information about the static objects may be used for navigation of the vehicle or used for obstacle avoidance.

In some embodiments, the plurality of objects may comprise permanent objects and temporary objects.

In some embodiments, the permanent objects may comprise traffic signs, traffic lights, roadlocks, or structures.

In some embodiments, the temporary objects may comprise construction, repair, parked cars, or accidents.

In some embodiments, the label information about the permanent objects may be used for navigation of the vehicle.

In some embodiments, the label information about the temporary objects may be used for navigation of the vehicle.

In some embodiments, the label information about the temporary objects may be used for a limited length of time from the detection of the temporary objects for navigation of the vehicle.

In some embodiments, the label information about the temporary objects may not be relied upon for navigation of the vehicle.

In some embodiments, the one or more communication units may be configured to transmit the data via a high-speed transmission network.

In some embodiments, the one or more communication units may be configured to transmit data derived from the map to one or more of a plurality of vehicles for facilitating at least one of navigation, map calibration, obstacle avoidance, or positioning of the one or more vehicles.

Moreover, aspects of the disclosure may be directed to a method of applying a three-dimensional map, said method comprising: obtaining data from a plurality of vehicles about an environment within which the plurality of vehicles are operating; generating, with aid of one or more processors, a map using the data from the plurality of vehicles; and applying the generated map for facilitating navigation of at least one of the plurality of vehicles.

In some embodiments, the one or more processors may be off-board the at least one vehicle.

In some embodiments, the one or more processors may be provided having a cloud computing infrastructure.

In some embodiments, the three-dimensional map may be stored off-board the vehicle.

In some embodiments, the method may further comprise providing information useful for navigation to at least one vehicle of the plurality of vehicles, wherein the information is derived from the three-dimensional map.

In some embodiments, the information useful for navigation may comprise a subset of the map comprising an environment within which the at least one vehicle is operating.

In some embodiments, the subset of the map may be used as a local map to navigate within the environment.

In some embodiments, the information useful for navigation may comprise at least one command.

In some embodiments, the at least one command may comprise one or more navigational commands for the at least one vehicle to follow.

In some embodiments, the information useful for navigation may be used by the at least one vehicle to autonomously travel to a specified destination.

In some embodiments, the information useful for navigation may be used by the at least one vehicle to modify a route of the at least one vehicle to the specified destination.

In some embodiments, the information useful for navigation may be used by the at least one vehicle to modify the specified destination while the at least one vehicle is en route to the specified destination.

In some embodiments, the information useful for navigation may be applied by the at least one vehicle for obstacle avoidance.

In some embodiments, the map may comprise traffic signs, traffic lights, billboards, roads, lane lines, pedestrian walkways, or structures.

In some embodiments, the map may be used by the at least one vehicle to calibrate its current location while the vehicle is en route to a specified destination.

In some embodiments, the map may be used by the at least one vehicle to update a local map used by the at least one vehicle.

In some embodiments, the map may be used by a mobile robot for navigation.

In some embodiments, the map may be used for building a three-dimensional map model of a large-scale scene.

In some embodiments, the map may be used for locating at least one of the plurality of vehicles.

In some embodiments, the map may be used for building a three-dimensional scene.

In some embodiments, the three-dimensional scene may comprise a simulation scene or a game scene.

Aspects of the disclosure may also be directed to a system of applying a three-dimensional map, said system comprising one or more processors configured to: obtain data from a plurality of vehicles about an environment within which the plurality of vehicles are operating; generate a map using the data from the plurality of vehicles; and apply the generated map for facilitating navigation of at least one of the plurality of vehicles.

In some embodiments, the one or more processors may be off-board the at least one vehicle.

In some embodiments, the one or more processors may be provided having a cloud computing infrastructure.

In some embodiments, the three-dimensional map may be stored off-board the vehicle.

In some embodiments, the one or more processors may be configured to provide information useful for navigation to at least one vehicle of the plurality of vehicles, wherein the information is derived from the three-dimensional map.

In some embodiments, the information useful for navigation may comprise a subset of the map comprising an environment within which the at least one vehicle is operating.

In some embodiments, the subset of the map may be used as a local map to navigate within the environment.

In some embodiments, the information useful for navigation may comprise at least one command.

In some embodiments, the at least one command may comprise one or more navigational commands for the at least one vehicle to follow.

In some embodiments, the information useful for navigation may be used by the at least one vehicle to autonomously travel to a specified destination.

In some embodiments, the information useful for navigation may be used by the at least one vehicle to modify a route of the at least one vehicle to the specified destination.

In some embodiments, the information useful for navigation may be used by the at least one vehicle to modify the specified destination while the at least one vehicle is en route to the specified destination.

In some embodiments, the information useful for navigation may be applied by the at least one vehicle for obstacle avoidance.

In some embodiments, the map may comprise traffic signs, traffic lights, billboards, roads, lane lines, pedestrian walkways, or structures.

In some embodiments, the map may be used by the at least one vehicle to calibrate its current location while the vehicle is en route to a specified destination.

In some embodiments, the map may be used by the at least one vehicle to update a local map used by the at least one vehicle.

In some embodiments, the map may be used by a mobile robot for navigation.

In some embodiments, the map may be used for building a three-dimensional map model of a large-scale scene.

In some embodiments, the map may be used for locating at least one of the plurality of vehicles.

In some embodiments, the map may be used for building a three-dimensional scene.

In some embodiments, the three-dimensional scene may comprise a simulation scene or a game scene.

Further aspects of the disclosure may comprise a method of applying a three-dimensional map, the method comprising: collecting, with aid of one or more sensors on-board one of a plurality of vehicles, data about environments within which the plurality of vehicles are operating; transmitting the data to one or more processors off-board the vehicle for generating the three-dimensional map; receiving the three-dimensional map related data from the one or more processors off-board the vehicle; and applying the three-dimensional map related data for navigation of the vehicle.

In some embodiments, the one or more processors off-board may be provided having a cloud computing infrastructure.

In some embodiments, the three-dimensional map may be stored off-board the vehicle.

In some embodiments, the method may further comprise providing information useful for navigation to at least one vehicle of the plurality of vehicles, wherein the information is derived from the three-dimensional map.

In some embodiments, the information useful for navigation may comprise a subset of the map comprising an environment within which the at least one vehicle is operating.

In some embodiments, the subset of the map may be used as a local map to navigate within the environment.

In some embodiments, the information useful for navigation may comprise at least one command.

In some embodiments, the at least one command may comprise one or more navigational commands for the at least one vehicle to follow.

In some embodiments, the information useful for navigation may be used by the at least one vehicle to autonomously travel to a specified destination.

In some embodiments, the information useful for navigation may be used by the at least one vehicle to modify a route of the at least one vehicle to the specified destination.

In some embodiments, the information useful for navigation may be used by the at least one vehicle to modify the specified destination while the at least one vehicle is en route to the specified destination.

In some embodiments, the information useful for navigation may be applied by the at least one vehicle for obstacle avoidance.

In some embodiments, the three-dimensional map may comprise traffic signs, traffic lights, billboards, roads, lane lines, pedestrian walkways, or structures.

In some embodiments, the three-dimensional map related data may be used by the at least one vehicle to calibrate its current location while the vehicle is en route to a specified destination.

In some embodiments, the three-dimensional map related data may be used by the at least one vehicle to update a local map used by the at least one vehicle.

In some embodiments, the three-dimensional map may be used by a mobile robot for navigation.

In some embodiments, the three-dimensional map may be used for building a three-dimensional map model of a large-scale scene.

In some embodiments, the three-dimensional map related data may be used for locating at least one of the plurality of vehicles.

In some embodiments, the three-dimensional map may be used for building a three-dimensional scene.

In some embodiments, the three-dimensional scene may comprise a simulation scene or a game scene In accordance with additional aspects of the disclosure, a vehicle of applying a three-dimensional map may be provided. The vehicle may comprise: one or more sensors configured to collect data about environments within which the plurality of vehicles are operating; one or more communication units configured to transmit the data to one or more processors off-board the vehicle for generating the three-dimensional map and receive the three-dimensional map related data from the one or more processors off-board the vehicle; and one or more processors on-board the vehicle configured to apply the three-dimensional map related data for navigation of the vehicle.

In some embodiments, the one or more processors off-board may be provided having a cloud computing infrastructure.

In some embodiments, the three-dimensional map may be stored off-board the vehicle.

In some embodiments, the three-dimensional map related data may provide information useful for navigation of the vehicle, wherein the information is derived from the three-dimensional map.

In some embodiments, the information useful for navigation may comprise a subset of the map comprising an environment within which the vehicle is operating.

In some embodiments, the subset of the map may be used as a local map to navigate within the environment.

In some embodiments, the information useful for navigation may comprise at least one command.

In some embodiments, the at least one command may comprise one or more navigational commands for the vehicle to follow.

In some embodiments, the information useful for navigation may be used by the vehicle to autonomously travel to a specified destination.

In some embodiments, the information useful for navigation may be used by the vehicle to modify a route of the vehicle to the specified destination.

In some embodiments, the information useful for navigation may be used by the vehicle to modify the specified destination while the vehicle is en route to the specified destination.

In some embodiments, the information useful for navigation may be applied by the vehicle for obstacle avoidance.

In some embodiments, the three-dimensional map may comprise traffic signs, traffic lights, billboards, roads, lane lines, pedestrian walkways, or structures.

In some embodiments, the three-dimensional map related data may be used by the vehicle to calibrate its current location while the vehicle is en route to a specified destination.

In some embodiments, the three-dimensional map related data may be used by the vehicle to update a local map used by the at least one vehicle.

In some embodiments, the three-dimensional map may be used by a mobile robot for navigation.

In some embodiments, the three-dimensional map may be used for building a three-dimensional map model of a large-scale scene.

In some embodiments, the three-dimensional map related data may be used for locating the vehicle.

In some embodiments, the three-dimensional map may be used for building a three-dimensional scene.

In some embodiments, the three-dimensional scene may comprise a simulation scene or a game scene.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

DETAILED DESCRIPTION OF THE EMBODIMENTS

Figure 1:
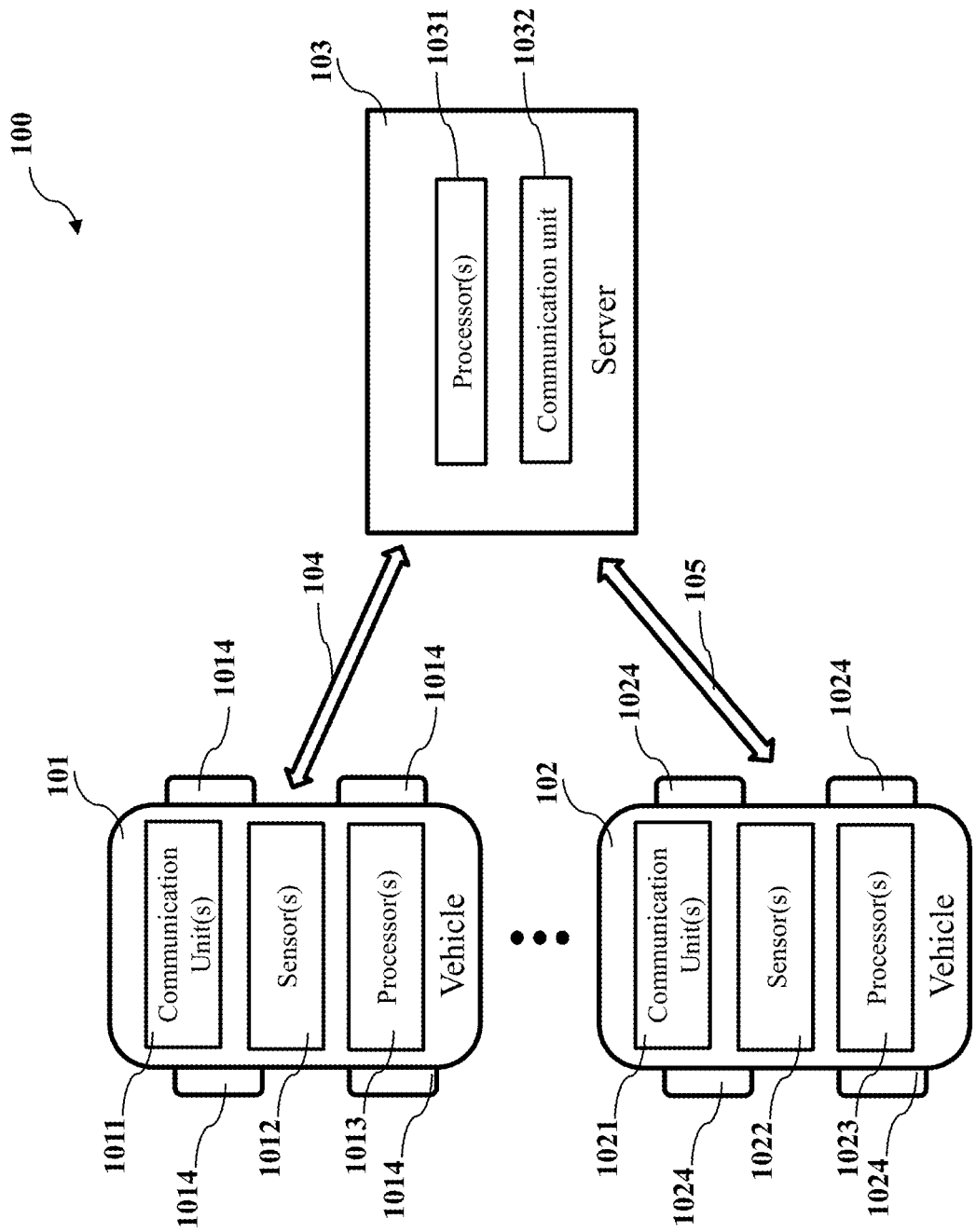
FIG. 1 shows a schematic block diagram of a map generation system including a plurality of vehicles and a remote server, in accordance with embodiments of the disclosure.

Systems, methods, and devices are provided for generating a map with high accuracy and precision. The map herein may be a two dimensional (2D) map or a three-dimensional (3D) map. The map may be remotely generated by one or more processors off-board a vehicle. Data for generating the map may be collected by a plurality of vehicles outfitted with one or more sensors or sensing devices. The sensors may be useful for detecting or sensing any objects within the surrounding environment of the vehicle. The data may be collected and/or aggregated, and analyzed at the vehicle prior to transmitting to the one or more processors off-board the vehicle. The data herein may include various types of data, including but not limited to image data, video data, 3D point cloud data, location data, label data, pose data, time data, or the like. In some instances, the data may be transmitted to the one or more processors via a high speed transmission network, such as a fourth generation (4G) wireless network. The one or more processors herein may be resided on one or more servers, such as cloud server(s) with cloud computing infrastructure. Upon receipt of data from one or more vehicles, the remote server may build a map using mapping algorithms, such as a Simultaneous Localization and Mapping (SLAM) algorithm. In some instances, the data received by the remote server may be used for updating or maintaining a previously-stored 3D map. Alternatively, the data received by the remote server may be used for fusion with the previously-stored 3D map. In some instances, the results of fusion operations may include obtaining an updated version of the previously-stored 3D map or generating a completely new 3D map.

The generated map may be used for many purposes. For example, the generated map can be used as a basis for generating calibration data for the vehicle. Thereby, the vehicle may be capable of calibrating its current location based on the calibration data. In some instances, the vehicle may be able to adjust its route to a specified destination using the calibration data. The calibration data may also be used for adjusting the direction or location of some sensors on-board the vehicle thereby changing detection ranges and improving the efficiency of data sensing. The map may also be used for other vehicles which do not participate in the data sensing or uploading. In some cases, the map generated based on the data collected by some vehicles can also be used by other vehicles which do not provide such data. For instance, the remote server may distribute the data derived from the map to other vehicles if these other vehicles are authorized for reception of such data. As an example, the server may derive road condition information from the map and share this information with other vehicles who do not contribute to the generation of the map. Thereby, in some cases, the other vehicles may bypass the roads with traffic congestion or accidents. In some embodiments, if necessary, the remote server may distribute the data derived from the map to any types of vehicles, such as aerial vehicles (e.g., an unmanned aerial vehicle) or ground-based vehicles (e.g., an unmanned automobile).

In some embodiments, the data derived from the map can also be distributed from a vehicle to one or more other vehicle. The vehicles herein may be the same type or different types. In this case, the vehicle, who distributes the data to other vehicles, can be a host vehicle which may be more powerful than other vehicles in terms of processing or storage capability. The other vehicles herein may be in the same geographic area as the host vehicle or in a different geographic area from the host vehicle. The other vehicle herein may communicate with the host vehicle using any suitable communication links, such as short-distance communication techniques. The number of the other vehicles can be any suitable number, for example, one, two, three, four, five, six, seven, eight or more. In some embodiments, the host vehicle can be selected from multiple vehicles or designated by the remote server. In this way, the burden of the remote server for distribution of data to multiple vehicles can be alleviated. This would be advantageous in some situations since the vehicles are much closer to each other than to the remote server and power consumption for data transmission can be significantly saved. Further, communication links may be more robust due to shorter communication distances.

In some embodiments, the generated map can be used for navigating the vehicle to a specified destination. For example, based on the position data about the vehicle and the generated map, the remote server may generate a route to a specified destination for the vehicle and progressively guide the vehicle to move along the route until the vehicle arrives at the specified destination. In doing so, the remote server may monitor the vehicle' movement and may transmit the calibration information as discussed above to the vehicle if it finds that the vehicle is departing from the scheduled route. Based on the calibration information, the vehicle may calibrate its current location, for example, for accurate positioning. In some instances, the vehicle may change its driving direction based on the calibration information.

Alternatively, the map generated in accordance with embodiments of the disclosure may be used by a third party entity or company rather than vehicles. For example, the map can be used by scientific research institution, such as colleges, for building a 3D scene for artificial intelligence (AI) application or virtual reality (VR) application. For instance, the 3D scene may comprise a simulation scene or a game scene within which a user may perform AI or VR interaction with a machine (e.g., a computer) or another user.

FIG. 1 shows a schematic block diagram of a map generation system 100 including a plurality of vehicles, such as vehicles 101 and 102, and a remote server 103, in accordance with embodiments of the disclosure.

The vehicle herein may comprise one or more propulsion systems that may enable the vehicle to move within an environment. The vehicle may comprise one or more sensors, such as sensors 1012 and 1022. The sensors may comprise one or more internal sensors that may sense information relating to the vehicle itself, thereby obtaining location and orientation information of the vehicle relative to one or more coordinate frames. The sensors may comprise one or more external sensors that may sense information relating to a surrounding environment outside the vehicle. The vehicle may comprise one or more communication units, such as communication units 1011 and 1021, that may enable the vehicle to communicate with an external device, such as one or more surrounding vehicles or a remote server 103.

The vehicle herein may be any type of vehicle. For instance, the vehicle may be capable of moving within an environment. A vehicle may be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; or a train), under the ground (e.g., a subway), in space (e.g., a spaceplane, a satellite, or a probe), or any combination of these environments. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). In one example, a vehicle may comprise automobiles, such as sedans, SUVs, trucks (e.g., pickup trucks, garbage trucks, other types of trucks), vans, mini-vans, buses, station wagons, compacts, coupes, convertibles, semi's, armored vehicles, or other land-bound vehicles such as trains, monorails, trolleys, cable cars, and so forth. Any description herein of any type of vehicle may apply to any other type of vehicle, capable of operating within the same environment or within different environments.

The vehicle may always be in motion, or may be at motions for portions of a time. For example, the vehicle may be a car that may stop at a red light and then resume motion. The vehicle may move in a fairly steady direction or may change direction. The vehicle may move on land, underground, in the air, on or in the water, and/or in space. The vehicle may be a non-living moving object (e.g., moving vehicle, moving machinery, object blowing in wind or carried by water, object carried by living target).

A vehicle may be capable of moving freely within the environment with respect to three degrees of freedom (e.g., three degrees of freedom in translation) or two degrees of freedom (e.g., two degrees of freedom in translation). In some other embodiments, a vehicle may be capable of moving in six degrees of freedom (e.g., three degrees of freedom in translation and three degrees of freedom in rotation). Alternatively, the movement of the vehicle can be constrained with respect to one or more degrees of freedom, such as by a predetermined path, track, or orientation. The movement can be actuated by any suitable actuation mechanism, such as an engine or a motor. For example, the vehicle may comprise an internal combustion engine (ICE), may be an electric vehicle (e.g., hybrid electric vehicle plug-in vehicle, battery-operated vehicle, etc.), hydrogen vehicle, steam-driven vehicle, and/or alternative fuel vehicle. The actuation mechanism of the vehicle can be powered by any suitable energy source, such as electrical energy, magnetic energy, solar energy, wind energy, gravitational energy, chemical energy, nuclear energy, or any suitable combination thereof.

The vehicle may be self-propelled via a propulsion system. The propulsion system may optionally run on an energy source, such as electrical energy, magnetic energy, solar energy, wind energy, gravitational energy, chemical energy, nuclear energy, or any suitable combination thereof. The propulsion system may comprise one or more propulsion units, such as wheels (e.g., 1014 and 1024 as shown), treads, tracks, paddles, propellers, rotor blades, jet engines, or other types of propulsion units. A vehicle can be self-propelled, such as self-propelled through the air, on or in water, in space, or on or under the ground. A propulsion system may include one or more engines, motors, wheels, axles, magnets, rotors, propellers, blades, nozzles, or any suitable combination thereof.

A vehicle may be a passenger vehicle. One or more individual may ride within a vehicle. The vehicle may be operated by one or more drivers. A driver may completely or partially operate the vehicle. In some instances, the vehicle may be fully manually controlled (e.g., may be fully controlled by the driver), may be semi-autonomous (e.g., may receive some driver inputs, but may be partially controlled by instructions generated by one or more processors), or may be fully autonomous (e.g., may operate in response to instructions generated by one or more processors). In some instances, a driver may or may not provide any input that directly controls movement of the vehicle in one or more directions. For example, a driver may directly and manually drive a vehicle by turning a steering wheel and/or depressing an accelerator or brake. In some instances, a driver may provide an input that may initiate an automated series of events, which may include automated movement of the vehicle. For example, a driver may indicate a destination, and the vehicle may autonomously take the driver to the indicated destination (i.e., a specified destination). In other embodiments, the vehicle may optionally not carry any passengers. The vehicle may be sized and/or shaped such that passengers may or may not ride on-board the vehicle. The vehicle may be a remotely controlled vehicle. The vehicle may be a manned or unmanned vehicle.

One or more sensors 1012 and 1022 may be on-board the vehicle. The vehicle may bear weight of the one or more sensors. The one or more sensors may move with the vehicle. The sensors may be partially or completely enclosed within a vehicle body, may be incorporated into the vehicle body, or may be provided external to the vehicle body. The sensors may be within a volume defined by one or more vehicle body panels, or may be provided in or on the vehicle body panels. The sensors may be provided within a volume defined by a vehicle chassis, or may be provided in or on the vehicle chassis. The sensors may be provided outside a volume defined by a vehicle chassis. The sensors may be rigidly affixed to the vehicle or may move relative to the vehicle. The sensors may be rigidly affixed relative to one or more components of the vehicle (e.g., chassis, window, panel, bumper, axle) or may move relative to one or more components of the vehicle. In some instances, the sensors may be attached with aid of one or more gimbals that may provide controlled movement of the sensor relative to the vehicle or a component of the vehicle. The movement may include translational movement and/or rotational movement relative to a yaw, pitch, or roll axis of the sensor.

A sensor can be situated on any suitable portion of the vehicle, such as above, underneath, on the side(s) of, or within a vehicle body of the vehicle. Some sensors can be mechanically coupled to the vehicle such that the spatial disposition and/or motion of the vehicle correspond to the spatial disposition and/or motion of the sensors. The sensor can be coupled to the vehicle via a rigid coupling, such that the sensor does not move relative to the portion of the vehicle to which it is attached. Alternatively, the coupling between the sensor and the vehicle can permit movement of the sensor relative to the vehicle. The coupling can be a permanent coupling or non-permanent (e.g., releasable) coupling. Suitable coupling methods can include adhesives, bonding, welding, and/or fasteners (e.g., screws, nails, pins, etc.). Optionally, the sensor can be integrally formed with a portion of the vehicle. Furthermore, the sensor can be electrically coupled with a portion of the vehicle (e.g., processing unit, control system, data storage) so as to enable the data collected by the sensor to be used for various functions of the vehicle (e.g., navigation, control, propulsion, communication with a user or other device, etc.), such as the embodiments discussed herein.

The one or more sensors may comprise zero, one, two or more internal sensors and/or zero, one, two or more external sensors. Internal sensors may be used to detect data relating to the vehicle itself. External sensors may be used to detect data relating to an object outside the sensing vehicle, such as objects within a surrounding environment of the vehicle. The external sensors may or may not be used to detect information relating to an environment around the vehicle, such as ambient conditions, external objects (e.g., moving or non-moving), driving conditions, and so forth. Any description herein of sensors on-board the vehicle may apply to internal sensors and/or the external sensors. Any description herein of an internal sensor may optionally be applicable to an external sensor, and vice versa. In some instances, a vehicle may carry both internal and external sensors. One or more of the internal and external sensors may be the same, or may be different from one another. For instance, the same or different types of sensors may be carried for internal and external sensors, or one or more different parameters of the sensors (e.g., range, sensitivity, precision, direction, etc.) may be the same or different for internal and external sensors.

In one example, internal sensors may be useful for collecting data of the vehicle. For example, one or more internal sensors may comprise one or more navigational sensors that may be useful for detecting position information pertaining to the vehicle. Position information may include spatial location (relative to one, two, or three orthogonal translational axes), linear velocity (relative to one, two, or three orthogonal axes of movement), linear acceleration (relative to one, two or three orthogonal axes of movement), attitude or pose (relative to one, two, or three axes of rotation), angular velocity (relative to one, two, or three axes of rotation), and/or angular acceleration (relative to one, two or three axes of rotation). The position information may include geo-spatial coordinates of the vehicle. The position information may include a detection and/or measurement of movement of the vehicle. The internal sensors may measure forces or moments applied to the vehicle. The forces or moments may be measured with respect to one, two, or three axes. Such forces or moments may be linear and/or angular forces or moments.

The internal sensors may measure other conditions relating to the vehicle. For example, the internal sensors may measure temperature, vibrations, magnetic forces, or wireless communications, experienced by the vehicle. The internal sensors may measure a characteristic of a component of the vehicle that may be in operation. For example, the internal sensors may measure power consumed by a communication unit, parameters affecting operation of a communication unit, error state of one or more components, or other characteristics of the vehicle.

The internal sensors may include, but are not limited to, global positioning system (GPS) sensors, inertial sensors (e.g., accelerometers (such as 1-axis, 2-axis or 3-axes accelerometers), gyroscopes, and magnetometers), temperature sensors, or any other type of sensors.

In one example, external sensors may be useful for collecting data about environments within which a plurality of vehicle operate. For example, one or more external sensors may be useful for scanning objects in the environment and collecting data pertaining to the objects in the environment while the vehicle is driving around. The objects within the environment may be dynamic or static objects. Alternatively or additionally, the objects within the environment may be permanent objects or temporary objects. The locations of the dynamic or temporary objects may be changing over time. For example, the dynamic or temporary objects may be moving within the environment, such as a moving vehicle, a roadlock, a repair, a pedestrian, a cyclist, an accident, or a parked car. In contrast, the locations of the static or permanent objects may be relatively fixed or keep stationary. For example, the static or permanent objects herein may be a landmark, a building, a traffic sign, a traffic light, a construction, or a structure. The one or more external sensors can sense the presence of the objects within the environment and identify these objects with aid of one or more processors on-board the vehicle, for example, processors 1013 and 1023. In an example, the data collected by the one or more external sensors may comprise label information (or identifying information) which can uniquely identify or represent the objects associated therewith. The label information herein may be obtained or determined after the sensors collect the data regarding the objects and identify the objects using image recognition technique. In some instances, the label information may comprise classification information or motion information which may be taken into account when generating a map, such as a 2D or 3D map. Additionally, the data collected by the one or more external sensors may comprise position information with regard to the identified objects within the environment. For instance, the position information may include spatial location (relative to one, two, or three orthogonal translational axes), linear velocity (relative to one, two, or three orthogonal axes of movement), linear acceleration (relative to one, two or three orthogonal axes of movement), attitude (relative to one, two, or three axes of rotation), angular velocity (relative to one, two, or three axes of rotation), and/or angular acceleration (relative to one, two or three axes of rotation). The position information may also include geo-spatial coordinates of the one or more surrounding objects. For example, the positional information may include latitude, longitude, and/or altitude of the one or more surrounding vehicles. The position information may include a detection and/or measurement of movement of the object. The positional information of the object may be relative to the vehicle, or relative to an inertial reference frame. For example, the positional information may include distance and/or direction relative to the vehicle. For instance, the positional information may designate that the surrounding object is several meters away and a certain degree to the right or left of the vehicle.

The external sensors may measure other conditions relating to the one or more surrounding objects within the environment. For example, the external sensors may measure temperature, vibrations, forces, moments, or wireless communications, experienced by the one or more surrounding objects. The external sensors may be able to detect accidents within the surrounding environment or accidents experienced by one or more surrounding vehicles. The external sensors may detect if an accident affects public transportation. The external sensors may also detect road construction that obstructs the traffic.

The one or more sensors carried by the vehicle may include but are not limited to location sensors (e.g., global positioning system (GPS) sensors, mobile device transmitters enabling location triangulation), vision sensors (e.g., imaging devices capable of detecting visible, infrared, or ultraviolet light, such as cameras including monocular cameras, binocular cameras, stereo cameras, and omnidirectional cameras), proximity sensors (e.g., ultrasonic sensors, laser lidar, microwave radar, time-of-movement cameras, infrared sensors), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The vehicle may comprise one or more communication units. The communication unit may permit the vehicle to communicate with one or more external devices. In some instances, the external device herein may be another vehicle with communication capability. Thereby, the vehicle may be able to directly communicate with the other vehicle via one or more communication units. In some instances, the external device herein may be a remote server with one or more processors, such as the one or more processors 1031 at a remote server 103. In this case, the vehicle may communicate directly with the one or more processors off-board the vehicle via the communication unit (e.g., communication unit 1032) over a network or indirectly via one or more intermediary devices. Thereby, the data collected and pre-processed by the one or more processors on-board the vehicle may be transmitted to the remote server for generating a 3D map or updating an existing map (e.g., a previously-stored map). It is to be understood that any description with respect to a remote server may apply to any other types of external devices and vice versa.

The communication unit may enable wireless communication between the vehicle and one or more processors at the remote server. The communication unit may support two-way communications (e.g., between the vehicle and the remote server) via wireless links, such as wireless links 104 and 105 with high data rates. The communication unit may have a limited distance or range. Alternatively, the communication unit may be capable of long-range communications. The communication unit may engage in point-to-point communications. The communication unit may be broadcasting information.

In one example, the communication unit may comprise one or more transceivers. The communication unit may comprise a transmitter and/or a receiver. The communication unit may be configured for any type of wireless communication as described elsewhere herein. The communication unit may comprise one or more antennas that may aid in the communications. The communication unit may or may not include a communication dish. The communication unit may be directional (e.g., operate strongest in a specified direction) or may operate substantially uniformly across all directions. The communication unit may be positioned anywhere on or in the vehicle. The communication unit may be provided within a volume contained by one or more body panels of the vehicle. The communication unit may be provided within a volume within a vehicle chassis. The communication unit may be external to a housing or body of the vehicle. A communication unit may be in communication with one or more sensors. The communication unit may receive data collected by the one or more sensors. In some embodiments, data collected by one or more sensors may be transmitted using the communication unit.

The data transmitted by the communication unit may optionally be raw data collected by the one or more sensors. Alternatively or in addition, the data transmitted by the communication unit may be pre-processed on-board the vehicle with aid of one or more processors, such as processors 1013 and 1023 as shown. The one or more processors may form an on-board computer or controller. For instance, the vehicle may comprise an electronic control unit (ECU). The ECU may provide instructions for one or more activities of the vehicle, which may include, but are not limited to, propulsion, steering, braking, fuel regulation, battery level regulation, temperature, communications, sensing, or any other operations. The one or more processors may be or may comprise a central processing unit (CPU), graphics processing unit (GPU), field-programmable gate array (FPGA), digital signal processor (DSP) and so forth.

In some embodiments, the one or more on-board processors may perform one or more pre-processing steps on the data collected by the sensors, prior to transmission of data to the communication unit of a remote server. For instance, the pre-processing may include formatting of the data into a desired format. Additionally, the pre-processing may include analysis of the sensor data with respect to the vehicle and/or with respect to an inertial reference frame (e.g., the environment). For instance, the pre-processing may include detection of the objects within the surrounding environment of the vehicle and determination of positional information relating to the objects. The positional information may be with respect to the vehicle or with respect to the inertial reference frame (e.g., geo-spatial coordinates). In some cases, the pre-processing may comprise identifying the objects in the sensed data and extracting features out of the sensed data. In this case, the sensed data may be image data including still images or dynamic videos collected by one or more vision sensors or proximity sensors. In some instances, with aid of a SLAM system constituted by the one or more sensors on-board the vehicle, simultaneous localization and mapping can be achieved by the vehicle, thereby gaining knowledge of the location of the vehicle in its current surrounding environment. As an example, the vehicle can be guided and navigated to a desired destination based on the SLAM system. During the navigation of the vehicle to the desired destination, the data collected by the one or more sensors on-board the vehicle can be transmitted via the communication units to the remote servers, which may also be deployed a SLAM system. Thereby, the collected data may be used for updating or refining the 3D map at the remote server.

The above has described some main components or modules of the vehicle or remote server in accordance with the embodiments of the disclosure. It should be understood that the descriptions herein of the vehicle or remote server are only for illustrative purposes and a person skilled in the art can envisage other components or modules that may be alternatively applied in the embodiments of the disclosure as necessary.

Figure 2:
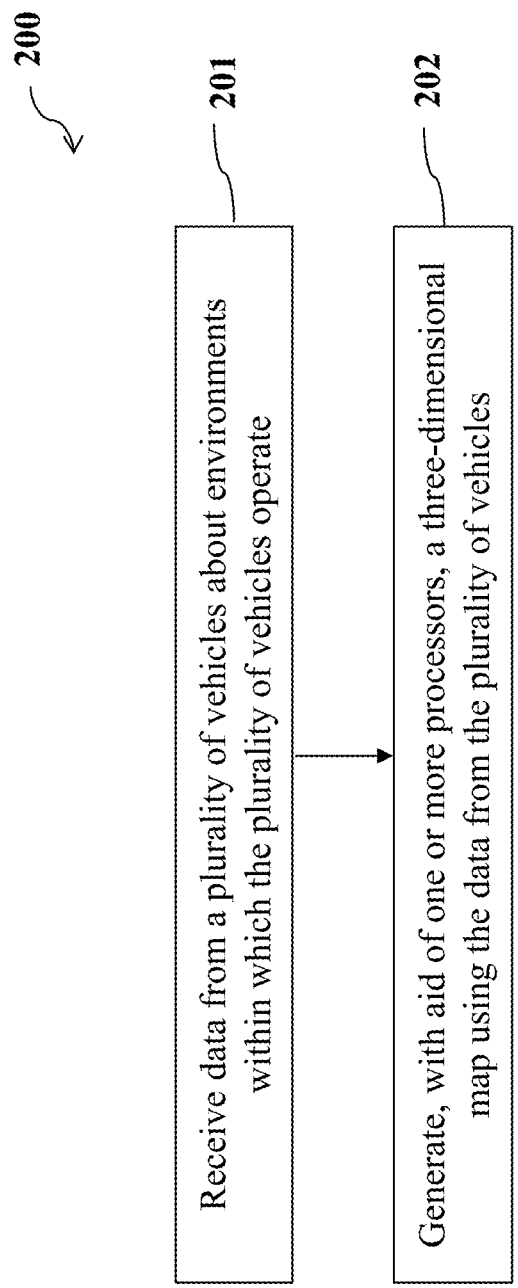
FIG. 2 shows a flowchart of a method of map generation at a remote server, in accordance with embodiments of the disclosure.

FIG. 2 shows a flowchart of a method 200 of map generation in accordance with embodiments of the disclosure. It is to be understood that the method as discussed herein may be related to operations of a plurality of vehicles and one or more processors off-board the vehicle and that the vehicle and one or more processors off-board the vehicle may be identical or similar to (or share one or more characteristics with) those vehicle and processors as described with reference to FIG. 1. Therefore, any descriptions of the vehicle and processors as made before and hereinafter can be equally applied to the method as discussed with reference to FIG. 2.

As illustrated in FIG. 2, at 201, data about environments within which a plurality of vehicles operate is received from the plurality of vehicles. The vehicles herein can be any types, including but not limited to sedans, coupes, pickup trucks, hatchbacks, station wagons, mini-vans, vans, buses, crossovers, SUVs, convertibles, trucks, motorcycles, carts, flatbeds, semis, transport trucks, shuttles, all-terrain vehicles, or any other types of vehicles. The vehicle may be capable of transporting at least 1, 2, 3, 4, 5, 6, 7, 8, 9, 10, 12, 16, 20, 30, 40, 50, 60, 70, or 100 people. The vehicle may have seats for any number of individuals, including the numbers listed herein.

The vehicle may comprise one or more propulsion units that may allow a vehicle to traverse an environment. The propulsion units may comprise one or more wheels that may come into contact with an underlying surface. The propulsion units may comprise treads, rollers, propellers, rotor blades, and/or nozzles that may permit the vehicle to move. The vehicle may comprise an engine or motor that may drive the vehicle. The vehicle may operate with aid of a fuel. The vehicle may operate using a gaseous fuel, liquid fuel, and/or solid fuel. The vehicle may operate using a diesel fuel. The vehicle may operate on a biofuel. The vehicle may be an electric vehicle, or may be a hybrid electric vehicle.

In some embodiments, the data herein can be collected by one or more sensors on-board the plurality of vehicles. The sensors may be removably attached to the vehicle or carried by the vehicle. In some cases, the sensors can be integrated or embedded into the vehicle. The one or more on-board sensors are capable of sensing the environment in proximity to or around the vehicle. In some embodiments, the one or more on-board sensors can be divided into external sensors and internal sensors. The external sensors may be capable of collecting data from the environment around the vehicle while the internal sensors may be capable of sensing a condition of the vehicle, or sensing a characteristic of a component on-board the vehicle. In some cases, internal sensors may also be capable of collecting data regarding the vehicle itself.

The sensors herein may be of a single type or multiple types. Examples of types of sensors may include, but are not limited to, location sensors (e.g., global positioning system (GPS) sensors, mobile device transmitters enabling location triangulation), vision sensors (e.g., imaging devices capable of detecting visible, infrared, or ultraviolet light, such as cameras, e.g., a monocular camera, a binocular camera, or an omnidirectional camera), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors. Optionally, the data can be received from sensors of different types (e.g., two, three, four, five, or more types). Sensors of different types may measure different types of signals or information (e.g., position, orientation, velocity, acceleration, proximity, pressure, etc.) and/or utilize different types of measurement techniques to obtain data. For instance, the sensors may include any suitable combination of active sensors (e.g., sensors that generate and measure energy from their own source) and passive sensors (e.g., sensors that detect available energy).

The sensors may have various detectable ranges, as will be discussed in detail with reference to FIG. 5. A detectable range of the sensor may include a region relative to the sensor where the sensor may collect data. The detectable range may include a distance range and/or a direction. For example, detectable range may include a maximum distance and/or minimum distance that can be read by the sensor. The minimum distance may be zero. The maximum distance may or may not be affected by environmental conditions (e.g., temperature, particulates in the air, precipitation, air pressure, noise, etc.). Direction may include an angle range. For instance, a sensor may have an angular range field of view. Sensors may not be capable of collecting data outside their detectable range. Areas outside the detectable range of a particular sensor may be a blind spot of the sensor. Different sensors may have different detectable ranges or the same detectable range. In some embodiments, the detectable ranges may be related to items including a direction, a speed, acceleration or an angular speed with respect to one or more wheels of the vehicle, when the vehicle is embodied as a wheel-driving vehicle. For example, the detectable ranges of the direction, speed, acceleration or the angular speed of the wheel can be provided by an Electronic Stability Control (ESC) system on-board the vehicle, which may include a master cylinder pressure sensor, four-wheel speed sensor, a steering-wheel angle sensor, a yaw rate sensor, an acceleration sensor, and etc for related detections.

The data collected by the one or more sensors may be applied for many purposes. In some situations, the data collected by the one or more on-board sensors can be used by the vehicle for obstacle avoidance. For example, the vehicle may detect one or more obstacles ahead of itself based on the data collected by the sensors, such as Lidar or sonar sensors, and adjust its driving direction such that the obstacles can be avoided, thereby reducing the likelihood of colliding with obstacles including other surrounding vehicles. In some cases, the data collected by the one or more sensors can include real-time location information of the vehicle, which is useful for location determination and navigation of the vehicle. Further, the real-time location information can also be used for monitoring the route of the vehicle en route to a specified destination and making a proper correction if the vehicle is departing from the planned route.

Alternatively, the data collected by the one or more processors on-board the vehicle may include various types of data. For example, the data may include types of files formed by corresponding sensors. In some cases, the data may include still images or dynamic videos as taken by one or more cameras. In some cases, the data as collected may be subject to pre-processing at the vehicle prior to transmission to the one or more processors off-board the vehicle, for example, to the remote server. In this way, the map generation in accordance with the embodiments of the disclosure would be more efficient since unnecessary data can be screened and computational burden at the remote server can be alleviated.

In some implementations, the data as collected may include label information or identifying information, which may be used for representing the objects as identified in the surrounding environment. For example, the label information herein may include classification or categorization information, or motion information of the objects. In this way, an object within the surrounding environment may be classified as a static object or a dynamic object. Alternatively, an object may be classified as a permanent object or a temporary object. For instance, the permanent objects may comprise traffic signs, traffic lights, roadblocks, or structures while the temporary objects may comprise construction, repair, parked cars, or accidents.

In an example, the label information about the dynamic objects can be used for obstacle avoidance by the at least one vehicle but is not relied upon for navigation of the at least one vehicle. This may be due to the fact that the dynamic objects have higher flexibility than the static objects and have the higher potential of actively colliding with the vehicle. Therefore, dynamic objects should be paid more attention to when considering obstacle avoidance. However, these dynamic objects may be moving out of the vehicle's route in a very short time of period and therefore may not be taken into account when navigating the vehicle. To this end, the generated map may be kept track of the obstacles present along the route of the vehicle and the remote server may transmit the label information regarding the obstacles to the vehicle when necessary for assisting the vehicle in avoiding the obstacles.

In an example, the label information about the static objects is used for navigation of the at least one vehicle or used for obstacle avoidance. In an example, when the label information about the static object indicates that a building is tens of meters away from the vehicle, this label information can be used as an indicator for guiding the vehicle towards the building if the building is the specified destination or a landmark in the route of the vehicle. In another example, when the label information about the static object indicates a traffic sign post in the middle of road, this label information can be used as an input of an obstacle avoidance system of the vehicle. Thereby, the vehicle may perform the obstacle avoidance properly so as to bypass the traffic sign post. Additionally or alternatively, the label information about the permanent objects can be used for navigation of the at least one vehicle. In this case, the permanent objects may keep stationary both in the map and at the real world, and therefore can be deemed as a landmark for navigation of the vehicle. In some embodiments, the label information about the temporary objects can also be used for navigation of the at least one vehicle or is not relied upon for navigation of the at least one vehicle. In this case, whether the label information about the temporary objects is used for navigation of the at least one vehicle may depend on the time duration of presence of the temporary objects in the map. In some cases, the label information about the temporary objects can be used for a limited length of time from the detection of the temporary objects for navigation of the at least one vehicle. For example, after the detection of the temporary objects, the label information about the temporary objects may be used for 10 minutes (m), 15 m, 16 m, 17 m, 18 m, 20 m, 25 m, 30 m, 1 hour (h), 2 h, 3 h, 4 h or more. In some cases, if the temporary object is road construction, the label information may be valid for serval days or even serval months. In this case, the label information may be used for both obstacle avoidance and navigation of the vehicle.

Referring back to FIG. 2, at 202, a 3D map may be generated with aid of one or more processors using the data from the plurality of vehicles. In an example, the 3D map herein may be generated with aid of a remote server, such as the one discussed with reference to FIG. 1. In an implementation, the remote server may be a cloud server and thereby the generated 3D map can be stored in memory using a cloud computing infrastructure. In this manner, local storage cost of the vehicle can be saved since relevant data associated with the 3D map can be remotely stored and retrieved when necessary. Further, the utilization of the cloud server may further facilitate the sharing of the 3D map among the vehicles and ensure confidentiality, integrity, availability and facticity of the data.

Although the above has described that the 3D map is generated by one or more processors off-board the vehicle (e.g., one or more processors at the remote server), in some embodiments, the generation of the 3D map can be completed in a coordinated manner. For example, some portions of the 3D map can be generated by one or more processors on-board the vehicle and some other portions of the 3D map can be generated by one or more processor off-board the vehicle, such as by an external device, e.g., a remote server at the cloud side. Then, all portions of the 3D map can be stitched or spliced as a complete map at the external device. In some embodiments, the data for generating a 3D map can also be collected by an aerial vehicle, such as the one shown in FIG. 12. For example, the image data may be collected using one or more cameras supported by the UAVs. The video data may include images or videos of an environment in which the UAVs operate. In some embodiments, the UAVs may be configured to transmit the video data to the remote server. Additionally, the UAVs may be configured to transmit operational data associated with the UAVs to the remote server. The operational data may include positional and/or motion characteristics of the UAVs or payloads (e.g., cameras) mounted onto the UAVs. For example, the operational data may include a position, attitude, navigation path, heading, altitude, motion characteristics (e.g., velocity and acceleration of the UAVs. Additionally, the operational data may include a position, attitude, and/or motion characteristics (e.g., angular velocity and acceleration) of one or more carriers (e.g., gimbals) that are mounted on the UAVs. The carriers may be configured to support one or more cameras for collecting the video data. In some embodiments, the UAVs may be configured to transmit environmental information to the remote server. The environmental information may be indicative of the environment in which the UAVs operate.

The video data may comprise live video that is being collected by the UAVs. The live video may be broadcasted over one or more channels, as described elsewhere herein. The video data may comprise 2-D video, 3-D video, stereoscopic video, multiview video, panoramic video, spherical video, and/or video provided from a first person view (FPV). The video data may be encoded using one or more encoders located on-board the UAVs, and the UAVs may be configured to transmit the encoded video to the remote server. Alternatively, the UAVs may transmit raw video to a ground vehicle, and one or more processors on-board the ground vehicle may be configured to pre-process the raw video before transmitting the video data to the remote server. In this manner, the 3D map generated by the remote server would be more comprehensive and includes more details, especially for those objects that are hard to detect from the ground. The generated 3D map could be more stereoscopic and of high definition.

The 3D map as generated may include a wide variety of information in the forms of the graphical or visual representations. In some cases, the 3D map may comprise traffic signs, traffic lights, billboards, roads, land lines, pedestrian walkways, or structure. The 3D map may also comprise 3D data associated with one or more scenes. In this case, the 3D data may comprise 3D point cloud data for representing the objects in the scenes in the three dimensions. For example, these 3D point cloud data can be used for constructing the surface of the object in the 3D map. In some cases, these 3D point cloud data can be collected by the vehicle in the vehicle's coordinate system and projected into data in the world coordinate system. In this manner, these 3D point cloud data can be fused with the previously-stored 3D map at the server. Alternatively, these 3D point cloud data can be used for updating the previously-stored 3D map at the server. As a result, a 3D map that has been subject to fusion or update operations can be of higher quality or precision, and up to date. For example, the 3D map according to the embodiments of the disclosure may support different scales in a format (x:y) (x denotes an illustrated distance on the map and y denotes a distance in the real world), for example, 1 cm: 150 cm, 1 cm: 180 cm, 1 cm: 200 cm, 1 cm: 220 cm, 1 cm: 250 cm, 1 cm: 280 cm, 1 cm: 300 cm, 1 cm: 350 cm, 1 cm: 400 cm, 1 cm: 450 cm, 1 cm: 500 cm, 1 cm: 800 cm, 1 cm: 1000 cm. The scales of the map may be greater than, less than or equal to any of the values provided. The scales of the map may be within a range between any two of the values provided herein.

In some cases, the 3D map may comprise image data. For example, the 3D map may include panoramic images about specific sites, e.g., a specific path, a specific road or a specific building, which may be of high interest to most of users. Thereby, the remote server may send these panoramic images to the vehicle as requested and thereby the user may get a chance to know about positional details of a place that he or she may want to visit. Alternatively, the 3D map may include dynamic videos with certain duration about specific sites, which can also be transmitted to the vehicle upon request. The length or duration of the video can be configured or set by the users or drivers of the vehicle dependent on the processing capability of one or more sensors or processors or storage space of the vehicle. The video files can also be partitioned or segmented by one or more processors at the remote server, thereby these segmented video being transmitted to the vehicle in a discontinuous manner.

The 3D map as generated may be used for multiple purposes. As an example, the 3D map can be used by at least one of the plurality of vehicles to calibrate a route while the vehicle is en route to a specified destination. Also, the 3D map can be used for locating at least one of the plurality of vehicles. In some cases, the 3D map can be used by at least one of the plurality of vehicles to calibrate its current location, for example, while the vehicle is en route to a specified destination. Additionally or alternatively, the 3D map can be used by at least one of the plurality of vehicles to update a local map used by the at least one vehicle. In some embodiments, the 3D map can be used by a vehicle to update its previously-planned path. In some cases, if the 3D map has been updated by a vehicle A, a planned path of a vehicle B can be altered based on the updates made by the vehicle A to the previously-stored 3D map.

In some embodiments, when a 3D map is generated for the UAV, it can be used for guiding the UAV along a flight path, indicating presence or absence of obstacles along the flight path, and/or weather conditions along the flight path. For example, the remote server may monitor the UAV's flight based on the data received from the UAV and assist the UAV in calibrating its location or flight direction, based on the 3D map.

In addition to being used by the vehicle, the 3D map may be used by a mobile robot for navigation. For example, the 3D map can be used by the mobile robot for military operation, medical aid, rescue, ground surveillance or the like. Further, the 3D map can also be used for building a 3D map model of a large-scale scene. The scene herein may comprise a simulation scene or a game scene, for example, roads, streets, blocks or specific areas or regions, established for artificial intelligence (AI) or virtual reality (VR) interaction between users or machines, or between the user and machine.

Figure 3:
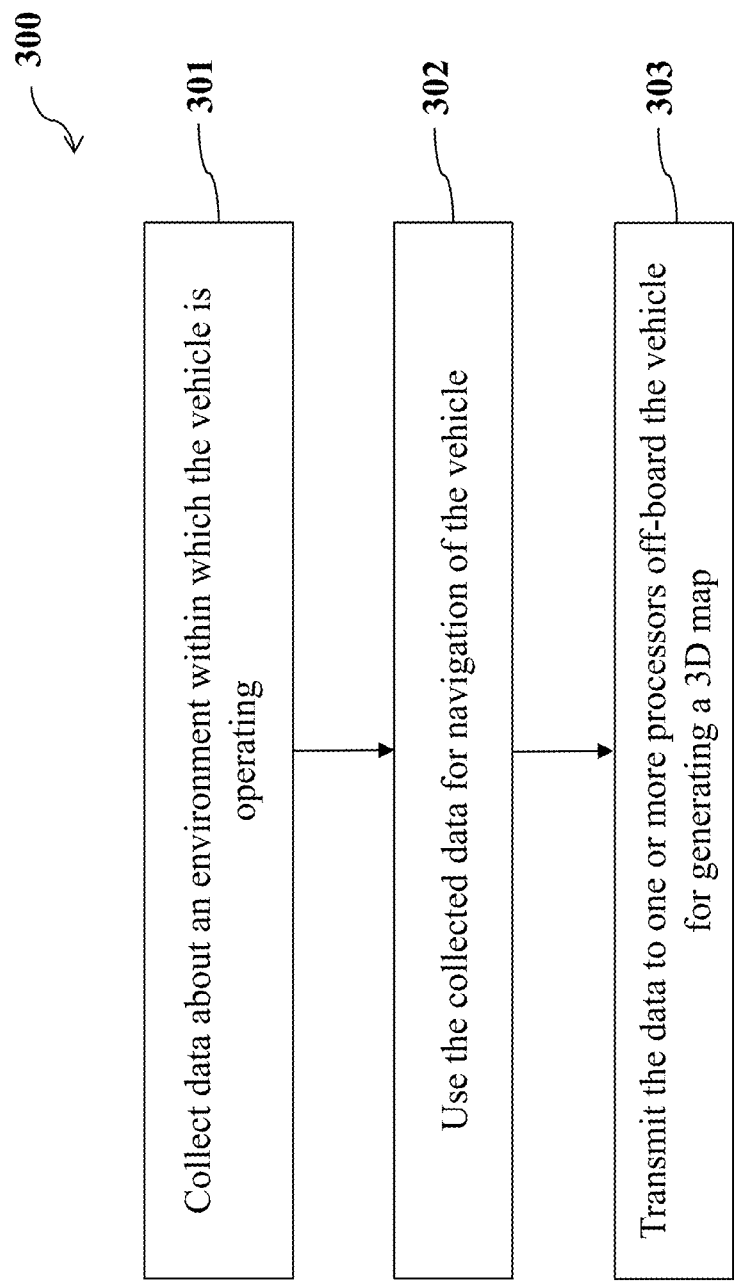
FIG. 3 shows a flowchart of a method of facilitating map generation, in accordance with embodiments of the disclosure.

FIG. 3 shows a flowchart of a method 300 of facilitating map generation, in accordance with embodiments of the disclosure. It is to be understood that the method as discussed herein may be related to operations of a plurality of vehicles and one or more processors off-board the vehicle and that the vehicle and one or more processors off-board the vehicle may be identical or similar to (or share one or more characteristics with) those vehicle and processors as described with reference to FIGS. 1 and 2. Therefore, any descriptions of the vehicle and processors as made before or elsewhere in this specification can be equally applied to the method as discussed with reference to FIG. 3.

As illustrated in FIG. 3, at 301, data about an environment within which at least one of a plurality of vehicles is operating is collected. As previously noted, the data may be collected by one or more sensors on-board the vehicle. In some cases, the one or more sensors herein may be grouped as external sensors and internal sensors. The external sensors may be used for sensing and collecting data regarding the environment surrounding the vehicle and the internal sensors may be used for detecting and collecting data regarding the vehicles itself. The sensors may be any types of sensors, including but not limited to location sensors (e.g., global positioning system (GPS) sensors, mobile device transmitters enabling location triangulation), vision sensors (e.g., imaging devices capable of detecting visible, infrared, or ultraviolet light, such as cameras, e.g., a monocular camera, a binocular camera, or an omnidirectional camera), proximity sensors (e.g., ultrasonic sensors, lidar, time-of-movement cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors).

The vehicles herein may be any types of vehicles. In some embodiments, the vehicle may be an unmanned vehicle including an unmanned aerial vehicle or an unmanned ground vehicle. The vehicle may not have a passenger or operator on-board the vehicle. The vehicle may or may not have a space within which a passenger could ride. The vehicle may or may not have space for cargo or objects to be carried by the vehicle. The vehicle may or may not have tools that may permit the vehicle to interact with the environment (e.g., collect samples, move objects). The vehicle may or may not have objects that may be emitted to be dispersed to the environment (e.g., light, sound, liquids, pesticides). The vehicle may operate without requiring a human operator.

In some instances, the vehicle may permit one or more passengers to ride on-board the vehicle. The vehicle may comprise a space for one or more passengers to ride the vehicle. The vehicle may have an interior cabin with space for one or more passengers. The vehicle may or may not have an operator. For example, a vehicle may have a space for a driver of the vehicle. In some embodiments, the vehicle may be capable of being driven by a human operator. Alternatively or in addition, the vehicle may be operated using an autonomous driving system.

The sensors may be distributed anywhere on the vehicle. The vehicle may comprise a vehicle body. The sensors may be distributed anywhere over the vehicle body. The sensors may be within an interior of the vehicle body, outside the vehicle body, or part of the vehicle body. The sensors may be distributed within a space defined by a vehicle chassis, outside a space defined by a vehicle chassis or may be part of the vehicle chassis. The sensors may be within a vehicle housing, outside a vehicle housing, or part of the vehicle housing. The sensors may be distributed on a top surface of a vehicle, bottom surface of a vehicle, front surface of a vehicle, rear surface of a vehicle, right side surface of a vehicle or a left side surface of a vehicle. The sensors may be distributed on an upper half of the vehicle, and/or lower half of the vehicle. The sensors may be distributed on a front half of the vehicle and/or a rear half of the vehicle. The sensors may be distributed around a perimeter of the vehicle.

Upon collecting the data about the environment, the data can be used for navigation of the vehicle at 302. In some cases, the collected data can be used by the vehicle to autonomously travel to a specific destination. As an example, the collected data can be used for localization and mapping for the vehicle via a SLAM system, thereby guiding the vehicle to avoid one or more obstacles while traveling along a path. The collected data can also be converted into one or more commands for the vehicle to follow. For example, if one or more obstacles are detected in the surrounding environment, the vehicle may be directed to adjust its driving direction, driving speed or even stop. In some embodiments, the collected data can be used for modifying a route of the vehicle to a specified destination. For instance, based on the collected data regarding the surrounding environment, the vehicle, with aid of one or more processors on-board the vehicle, is capable of deciding whether to follow a previously-planned path or update it in view of the changed environment. In some situations, if the environment is significantly changed according to the collected data, for example, road closure caused by an accident, the vehicle may have to re-plan its route with aid of a local map.

In some embodiments, a location of the vehicle can be determined and calibrated in real-time based on the collected data. For example, based on the data collected by position sensors or location sensors, such as the Lidar sensors, sonar sensors, or GPS sensors, the current location of the vehicle can be precisely determined. Thereby, the vehicle may properly amend its route if needed or send its current location to a remote server for location update. In some cases, the vehicle is capable of performing obstacle avoidance based on the collected data. For example, the vehicle may be aware of one or more obstacles ahead of itself or present along the planned route based on the collected data. Therefore, the vehicle may properly and autonomously adjust its route or driving direction so as to avoid such obstacles.

In some cases, the collected data can be subject to pre-processing on-board the vehicle. For example, when the collected data includes image data including still images and video data taken by the cameras, it can go through image processing including image recognition and feature extraction, thereby objects within the surrounding environment being determined. In some cases, when the collected data includes 3D point cloud data and RGB images formed from vision sensors including Lidar units, monocular cameras, binocular cameras, or omnidirectional cameras, environmental information with respect to at least 360 degrees surrounding the vehicle can be obtained. This environmental information can be further fused to precisely determine the location of the vehicle.

The collected data may include scene information collected by one or more cameras. Traffic signs, traffic lights, landmarks, or lanes in the scene information can be identified and added a label using a deep learning system or algorithm. Thereby, label information associated with these objects can be added to the point cloud data, enriching the content presented in a 3D map to be generated.

In some embodiments, having been collected via one or more sensors on-board the vehicle, the data is transmitted to one or more processors off-board the vehicle for generating a 3D map at 303. As previously noted, the one or more processors off-board the vehicle can be resident on a remote server, such as a cloud server with a cloud computing infrastructure. The transmission of the data to the remote server can be done using a high speed transmission network. For example, the transmission network herein may include a wireless network including a 4G or a 5G network. In this case, the data including image data and Lidar-related data can be formatted into a 4D data packet and transmitted via a 4G network to the remote server, such as exemplarily shown in FIG. 4.

In an example, the data from the plurality of vehicles are provided at a variable frequency. The frequency of data collection and/or communication by the vehicles may be determined with aid of one or more processors. The one or more processors may automatically determine the frequency of data collection and/or communication, and maintain and/or vary the frequency. User input may or may not be utilized. In some instances, a user may determine the frequency level, or rules used by the processors to determine the frequency level. Alternatively, the one or more processors may be pre-programmed without requiring user input. The frequency may be determined based on one or more conditions, such as those described in greater detail as follows.

The frequency depends on activity of the vehicles. For instance, the frequency may depend on speed of the vehicles. Thereby, a higher frequency may be provided for a higher speed of the vehicles. For example, in a situation where the vehicle is in a traffic jam and the speed of the vehicle is very lower, for example, at a speed of less than 20 km/hour, 18 km/hour, 15 km/hour, 12 km/hour, or 10 km/hour, there may be redundant or overlapping in the data captured by the sensors about the surrounding environment, which is not changing fast due to low speed of the vehicle. In some instances, the frequency of data collection by the sensors may be less when the vehicle is traveling more slowly, since there is less likely to be significant change. Optionally, the frequency of providing the data to the cloud server can be lowered so that less redundant data would be transmitted to the cloud server for generating or updating the 3D map. When the frequency of data communication to the server is varied, the frequency of data collection may or may not be correspondingly varied. In some instances, data collection may also be varied to match the frequency of the data communication (e.g., less frequency of data communication may correspond to less frequency of data collection, and/or greater frequency of data communication may correspond to greater frequency of data collection). In other instances, data collection frequency may be independent of data communication frequency. If data communication frequency is lowered, there may be more data that has been collected that may be accumulated and transmitted. In some instances, when data communication frequency is decreased, some of the collected data may be discarded or not transmitted.

In another example, the frequency may depend on complexity of activity of the vehicles and therefore a higher frequency is provided for a greater complexity of activity of the vehicles. For example, if the vehicle is changing its directions frequently, the amount of data collected by the sensors due to these quick changes can be significantly grown. Thereby, the vehicle may speed up the transmission of the data to the cloud server, thereby reducing the data accumulation at the vehicle. The vehicle changing direction frequently may provide greater variance to the environment sensed by the vehicle and may benefit from more frequent data collection. In some instances, the data collection frequency may be increased when there is higher complexity of activity of the vehicles. Higher complexity of the activity of the vehicle may correspond to more direction changes, more variability in speed, and/or more variability in acceleration.

Additionally, the frequency may depend on data obtained from one or more other vehicles within a proximity of the at least one vehicle. In one case, the other or more other vehicles may provide data to the at least one vehicle. A lower frequency may be provided for more data obtained from the one or more other vehicles. For example, since the vehicle receives more data from other vehicles, it may take more time to receive, analyze and packetize these data before sending them out to the cloud server; therefore, lowering the frequency of transmitting data to the cloud server may alleviate the burden of the data processing of the vehicle. In another case, the one or more other vehicles may also transmit collected data to the server. A lower frequency of data collection and/or communication may be provided from the at least one vehicle when there is a greater number of other vehicles within a proximity of the at least one vehicle that are also providing data to the map. When a larger number of vehicles are providing data on an overlapping region, then less frequency may be required since more data is being provided for the same region. In some instances, a lower frequency of data collection and/or communication may be provided from the at least one vehicle when the other vehicles are providing a greater frequency of data communication. A higher density of vehicles within a given area may result in less frequency of data collection or communication by one or more of those vehicles.

In some embodiments, the frequency may depend on an assessed reliability of the data obtained from the one or more other vehicles within the proximity of the at least one vehicle. In this case, a lower frequency may be provided for a greater assessed reliability of the data from the one or more other vehicles. If the data from the other vehicles are considered to be reliable, then less data may be required from the at least one vehicle for the same area. If the data from the other vehicles are considered to be less reliable, then a higher frequency may be desirable from the at least one vehicle. In some instances, the reliability may be assessed relative to an absolute scale or relative to other vehicles in the area.

In some embodiments, the frequency may depend on detection or location of one or more dynamic objects previously detected within a proximity of the at least one vehicle. For instance, if more dynamic objects have been detected within the proximity, the vehicle may collect and/or transmit the data associated with these objects at a higher frequency. If fewer dynamic objects have been detected within proximity of the vehicle may collect and/or transmit data at a lower frequency. More dynamic objects may suggest that there may be greater variables and possibility of change in the environment around the vehicle, and a higher frequency of data about the environment may be desirable. In some instances, the frequency may depend on a number of dynamic objects, speed of dynamic objects, and/or complexity of activity of the dynamic objects. A greater number of dynamic objects, greater speed of dynamic objects, and/or higher complexity of activity of the dynamic objects may cause a higher frequency of data collection and/or transmission by the vehicle.

In some instances, a single condition, such as a single factor from those listed above, may be used to determine a frequency of data collection and/or transmission by the vehicle. In some instances, multiple conditions, such as a plurality of the factors from those listed above may be used to determine a frequency of data collection and/or transmission by the vehicle. The multiple factors may be considered equally or may be weighted. The variable frequency may be calculated based on the various factors, such as those described elsewhere herein. In some instances, the frequency may vary within a maximum range. In some instances, the frequency may vary within a range between any two of the following values: 0.00001 seconds, 0.00005 seconds, 0.0001 seconds, 0.0005 seconds, 0.001 seconds, 0.003 seconds, 0.005 seconds, 0.007 seconds, 0.01 seconds, 0.03 seconds, 0.05 seconds, 0.1 seconds, 0.3 seconds, 0.5 seconds, 1 second, 1.5 seconds, 2 seconds, 3 seconds, 5 seconds, 7 seconds, 10 seconds, 15 seconds, 20 seconds, 30 seconds, 45 seconds, 1 minute, 90 seconds, 2 minutes, 3 minutes, 5 minutes, 7 minutes, 10 minutes, 15 minutes, 20 minutes, 30 minutes, 45 minutes, or 1 hour.

In some cases, the data from the plurality of vehicles can be provided on a regular basis. For example, the plurality of vehicles can transmit the collected data at a certain frequency specified by the user. The frequency here may depend on the distance of the route as planned by the user. For example, if the route can be segmented into ten or more sections, then the vehicle may upload its collected data to the remote server each time it reaches a specific section. The frequency herein may also depend on the duration spent on the whole route. For example, if it is pre-determined that it will possibly take one hour to get to the specified destination, then the vehicle may provide its collected data at a time interval of five-minute, i.e., the vehicle will transmit the collected data twelve times while traveling along the route.

After generating a 3D map with high-precision, the remote server can apply the 3D map for facilitating navigation of the vehicle. For example, based on the 3D map, the remote server may precisely determine whether the vehicle is on the right track based on the location data reported from the vehicle. In some instances, the remote server may generate a correct route for the vehicle with aid of the 3D map after determining that the current route of the vehicle is not right or is inefficient for reaching the specified destination. Therefore, the data including the correct route may be transmitted via the 4G network to the vehicle, which then can update its current route and effect it immediately. In some instances, the remote server may monitor and locate the vehicle based on the 3D map and calibrate the vehicle's location if needed. For example, once it determines the location of the vehicle is incorrect based on the 3D map, the remote server may generate calibration information for the vehicle and send it to the vehicle, which may calibrate its current location properly.

Figure 4:
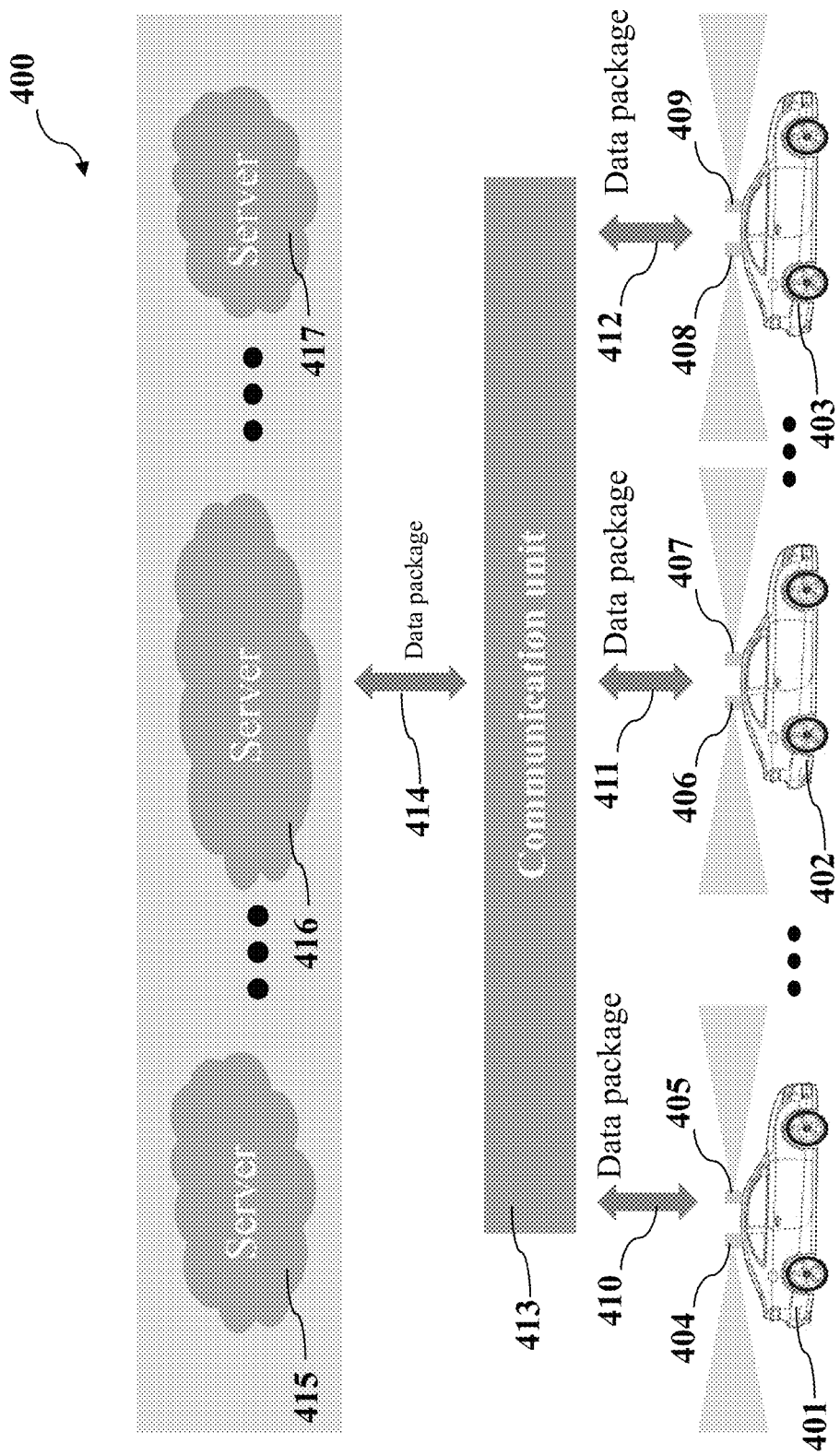
FIG. 4 shows an exemplary scenario of a map generation system, in accordance with embodiments of the disclosure.

FIG. 4 shows an exemplary scenario of a map generation system 400, in accordance with embodiments of the disclosure. The map generation system herein may comprise a plurality of vehicle, such as vehicles 401, 402, and 403, which can be autonomous cars, semi-autonomous cars or manual-driving cars or a combination thereof. During the operations, for example, moving along a path or road, the vehicles can collect various types of data about the surrounding environments. For example, with aid of one or more sensors 404, 405, 406, 407, 408 and 409 disposed on the roofs of the vehicles, the vehicles are capable of sensing objects within the surrounding environment and collecting data associated with the objects based on detectable distances of the sensors. As an example, the sensors may include various types of cameras, location sensors, and Lidar sensors for constituting a SLAM system, thereby conducting simultaneous localization and mapping for the vehicle. The sensing and collection herein can be carried out in a continuous or discontinuous manner, or on a regular basis, which can be preset by the user or changed with the changing environments. The data herein can be of any types, such as image data including 3D point cloud data or location data.

Once the data for generating a 3D map or facilitating generation of the 3D map is available, the data can be transmitted via communication links 410, 411, 412 and 414 to one or more servers 415, 416, and 417 at a cloud side through one or more communication units 413. The data can be formatted into a certain format specified by communication protocols followed by the communication units. The servers herein may include one or more processors off-board the vehicle. In some cases, the servers herein may be embodied as a remote server, such as a cloud server with a cloud computing infrastructure. Thereby, the data transmitted via the communication units can be remotely stored off-board the vehicle. In some embodiments, some vehicles may support two-way communication with the remote server and some other vehicles may support one-way communication with the remote server. For example, the one-way vehicle may transmit the collected data to the remote server and only receive the data derived from the 3D map from other vehicles, such as a host vehicle, which supports two-way communication with the remote server and delivers the data to the one-way vehicle.

In some cases, the communication units herein can support (or be provided via) any types of high-speed transmission networks, such as 4G communication networks, including e.g., Time Division Duplex Long Term Evolution (TDD-LTE) or Frequency Division Duplex (FDD)-LTE networks. In a typical situation, a static transmission rate of a 4G network can reach up to 1 Gbps and a downlink transmission rate can be nearly 100 mbps when the vehicle according to the embodiments of the disclosure is moving at a high speed while collecting surrounding environmental data. The data transmission rate herein may be 50 mbps, 55 mbps, 60 mbps, 65 mbps, 70 mbps, 75 mbps, 80 mbps, 85 mbps, 90 mbps, and 95 mbps, and may be more or less than 100 mbps based on the specific network environment. In some implementations, when the vehicle is an autonomous vehicle, 12 single-channel lidars can be used to detect an environment within which the vehicle is operating. In this scenario, a frame rate of lidar can be 10 Hz and a data volume of 12 lidars can reach up to 5 Mbps. When a camera with an acquisition rate of 40 Hz is used in combination with the lidars to collect data, data compression methods (e.g., down-sampling or H.264) can be employed to compress lidar data and image data. Thereby, the compressed data can be efficiently transmitted over the 4G network to the remote servers for further processing, such as map generation.

In addition to transmitting the raw data collected by the sensors directly to the one or more remote servers, the data at the vehicles can be pre-processed by the vehicle, for example, via an autonomous driving system included in the vehicle. For instance, various types of data, such as lidar data collected by one or more lidars, image data collected by vision sensors, label (or tag) information of objects which is recognized by deep learning from the image data, and vehicle position information, can be encapsulated into one or more 4G data packets and uploaded to the cloud servers using 4G communication units. It should be understood that the 4G network as applied in the embodiments of the disclosure is only for illustrative purposes and any other types of network can also be applied herein, e.g., the fifth generation (5G) network.

The servers, such as servers 415, 416, and 417 as depicted in FIG. 4, may have powerful computing resources and are capable of generating and maintaining a 3D map of a given region, such as an entire city, a state or a country. The 3D map may comprise 3D RGB data and/or point cloud data and marked objects, such as traffic signs, landmark, traffic lights, buildings, constructions, blocks, grass, or the like. In some cases, subsequent to receiving 3D point cloud data and pose data from the vehicle over a 4G network, the cloud server, with aid of one or more processors, may perform a SLAM algorithm to generate a 3D map directed to an unknown region if the vehicle is traveling in the unknown region. The newly-generated 3D map herein may be of high-precision and include 3D data associated with the environment, lanes, traffic signs, buildings, characteristics of buildings (such as restaurants for dinner or supermarkets for shopping), characteristics of roads (such as direction indicators or direction signs in the lanes).

In case that the vehicle is traveling around a known region, the cloud server can match the pose information of the vehicle with the 3D map previously generated and maintained at the cloud server. In some instances, if a significant deviation is discerned from the matching, then a calibration will be performed on the matching result and the calibration-related data can be transmitted to the vehicle for calibration operations at the vehicle, for example, calibrating the pose, route, location of the vehicle. In some cases, if the collected data indicates scene changes occurring due to for example road constructions or road repairs, the 3D map can be updated accordingly based on the changes. Meanwhile, these changes made to the 3D map can be transmitted to the vehicle at issue. In some embodiments, these changes can also be provided via the communication network to other vehicles as reference information for path planning of other vehicles. For example, the cloud server can transmit the information with regard to these changes to other vehicles. Additionally or alternatively, the vehicle, which first received the information, can forward it to other vehicles such that transmission cost of the cloud server in this regard can be saved. In some situations, this would be advantageous since the communication distances between the relevant vehicles are significantly shorter than those between the vehicle and the cloud server, thereby improving communication stability and efficiency.

In some embodiments, the cloud server may also help the vehicle navigate along a planned route. For example, the cloud server is able to evaluate path planning of the vehicle after receiving the data collected by the vehicle. If the path planned by the vehicle passes through inaccessible regions (e.g., construction or job sites, accident scenes), the cloud server may generate a new path for the vehicle based on the 3D map and transmit data related to the new path to the vehicle. In this way, the user can select a new and feasible path instead of the old one. In some cases, if the cloud server finds that the vehicle's positioning is substantially different from the 3D map, the server can send a calibration message relating to the positioning to the vehicle, such that the position of the vehicle can be accurately calibrated.

The above has described components, units, modules, and functions of the map generation system in accordance with the embodiments of the disclosure. It is to be understood that the descriptions herein with regard to the map generation system are only for illustrative purposes and should not be limited thereto. The map generation system as discussed with respect to FIG. 4 can comprise one or more other or additional modules or units as necessary and some modules or units as depicted in FIG. 4 can be integrated or combined. For example, although depicted as a separate unit, the communication units as shown can be also mounted or deployed at the vehicle or cloud side, such that the vehicle and cloud server can be directly communicating with one another. It should also be understood that the descriptions about the functions of each component depicted in FIG. 4 are only for illustrative purposes. A person skilled in the art, based on the teaching herein or elsewhere in the specification, can envisage that more functions and effects can be achieved based on the map generation system, as will be discussed further hereinafter.

Figure 5:
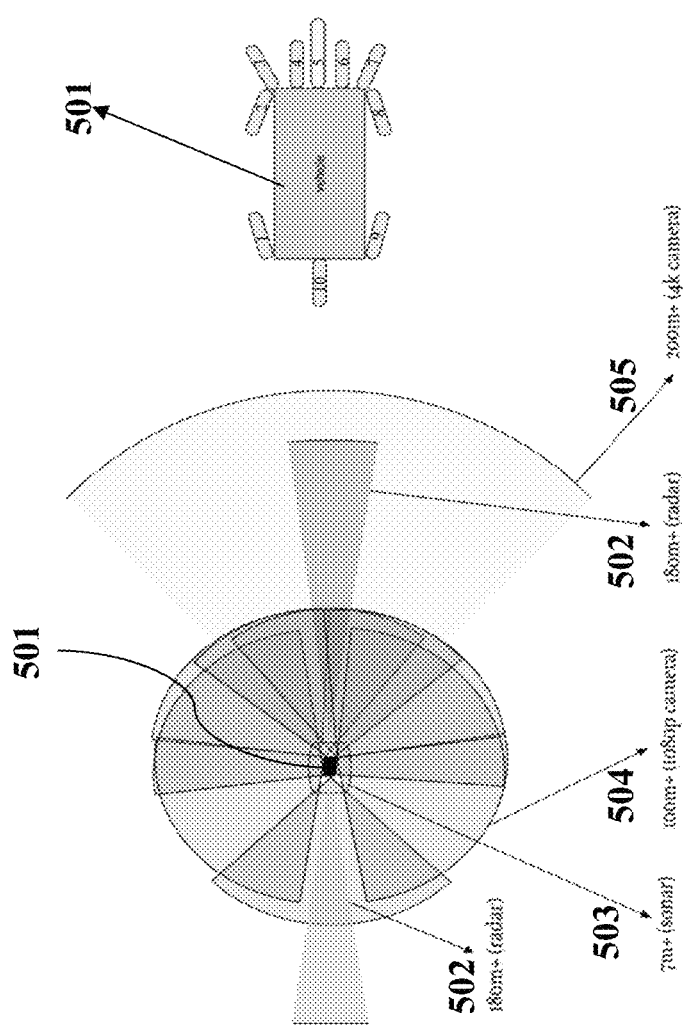
FIG. 5 shows an example of detectable ranges of various sensors that may detect an environment around a vehicle, in accordance with embodiments of the disclosure.

FIG. 5 shows an example of detectable ranges of various sensors that may detect an environment around a vehicle, in accordance with embodiments of the disclosure. Any variation of the various detectable ranges for different types of sensors as described elsewhere herein, may apply.

In one example as shown at a left side of FIG. 5, a vehicle 501, which can be equal to or similar to (or share some characteristics with) the vehicle as discussed before with reference to any of FIGS. 1-4, may comprise a sensing system with a radar having a first detectable range 502 (e.g., 180 meters or more), sonar having a second detectable range 503 (e.g., 7 meters or more), 1080p cameras having a third detectable range 504 (e.g., 100 meters or more), 4k camera having a fourth detectable range 505 (e.g., 200 meters or more), and/or lidar units having a fifth detectable range. In some embodiments, the various detectable ranges may be circles, sectors of circles, cones, or any other shape or combination thereof.

For instance, the detectable range may span an aggregated amount of less than or equal to about 15 degrees, 30 degrees, 45 degrees, 60 degrees, 75 degrees, 90 degrees, 120 degrees, 150 degrees, 180 degrees, 210 degrees, 240 degrees, 270 degrees, or 360 degrees around the vehicle. The detectable range may span an aggregated amount of greater than any of the values provided. The detectable range may be within a range between any two of the values provided herein. These may include lateral degrees around the vehicle. These may include vertical degrees around the vehicle. These may include both lateral and vertical degrees around the vehicle. Any of the aggregated amount of the detectable range may be provided in a single continuous detectable range, or may be broken up over multiple detectable ranges that collectively form the aggregated amount. Any of the aggregated amount of detectable range may be measured using a single sensor or multiple sensors. For instance, the vehicle may have a single sensor that may have any of the detectable ranges provided herein. In another example, the vehicle may have two sensors, three sensors, four sensors, five sensors, six sensors, or more sensors that may collectively span the detectable ranges provided herein. When multiple sensors are provided, their detectable ranges may or may not overlap.

The detectable range may be provided in any direction or combination of directions relative to the vehicle. For example, the detectable range may be towards the front, rear, left side, right side, bottom, top, or any combination thereof relative to the vehicle. The detectable range may form a continuous area around the vehicle or may comprise multiple discontinuous areas. The detectable range may include a line-of-sight or other region relative to the one or more sensors.

In some instances, the detectable range may relate to a distance relative to the vehicle. For example, a detectable range may be less than or equal to about 1 m, 3 m, 5 m, 10 m, 15 m, 20 m, 30 m, 40 m, 50 m, 70 m, 100 m, 200 m, 400 m, 800 m, 1000 m, 1500 m, 2000 m, or more. The detectable range may be greater than or equal to any of the values provided. The detectable range may be within a range between any two of the values provided herein.

Any combination of direction and/or distance relative to the vehicle may be provided for the detectable range. In some instances, the detectable range may have the same distance, regardless of the direction. In other instances, the detectable range may have different distances, depending on the direction. The detectable range may be static relative to the vehicle. Alternatively, the detectable range may be dynamic relative to the vehicle. For instance, the detectable range may change over time. The detectable range may change based on environmental conditions (e.g., weather, precipitation, fog, and temperature), surrounding traffic conditions (density, movement of surrounding vehicles), obstacles, power supply to sensors, age of sensors, and so forth.

In some instances, one or more sensors may be static relative to the vehicle. The detectable range may remain static while the sensors are static relative to the vehicle, or may change (e.g., based on environmental conditions, etc.). Optionally, one or more sensors may be dynamic relative to the vehicle. The detectable range may be dynamic when the sensors are dynamic relative to the vehicle. The sensors may change orientation relative to the vehicle and/or translate along one or more axes relative to the vehicle.

In some embodiments, a sensing system may be provided, to aid in autonomous operation of the vehicle. The sensing system may comprise a first set of sensors and a second set of sensors. The first set of sensors may comprise two or more different types of sensors. The first set of sensors may be oriented in a forward-facing direction and configured to detect two or more regions in front of the vehicle. The regions may or may not overlap with one another. In some embodiments, a first detectable region may lie completely within a second detectable region. Optionally, a portion of the first detectable region lies within the second detectable region, and a portion of the first detectable region lies outside the second detectable region. The first and second detectable regions may have different ranges. For example, a range of a second detectable region may be greater than a range of the first detectable region. An area or volume of the first detectable region may be determined by a scan angle of a first sensor type and an area or volume of a second detectable region may be determined by a scan angle of a second sensor type. The scan angles of the first and second sensor types may be different or the same. For instance, the scan angle of the first sensor type may be greater than a scan angle of the second sensor type. The detection range of the first sensor type may be less than or equal to the detection range of the second sensor type. Different sensor types may be detecting the two or more regions. The second set of sensors may comprise one or more types of sensors oriented in a plurality of directions and configured to detect one or more regions surrounding or in proximity to the vehicle. The second set of sensors may be configured to collectively detect an area at least 180, 270, or 360 degrees around the vehicle. The range of the first set of sensors may extend farther away from the vehicle compared to the range from the second set of sensors. In one example, a forward facing sensor and/or rear facing sensor may have a greater distance range than one or more sets of sensors that may be configured to have a greater angular range (e.g., having an angular range of at least 180, 270, or 360 degrees). In some embodiments, the first set of sensors and the second set of sensors may share some sensors that are of the same type. In some embodiments, the first set of sensors and the second set of sensors may share some common sensors (i.e. one or more sensors may be commonly utilized by both the first and second sets of sensors).

In some embodiments, the first set of sensors may comprise a monocular camera, a long range lidar unit, and/or a millimeter-wavelength radar unit. In some embodiments, one or more sensors may be oriented backwards. The backwards facing sensors may comprise a monocular camera, a binocular camera, an omnidirectional camera, a long range lidar unit, and/or a millimeter-wavelength radar unit. In some embodiments, more forward-facing sensors may be provided than backward-facing sensors. In some embodiments, one or more sensors facing forward may operate with a higher resolution or precision than one or more of the backward facing sensors. For example, a forward-facing monocular camera may have a higher imaging resolution than a backward-facing monocular camera. For example, the forward-facing monocular camera may have a 4K imaging resolution while a backward-facing monocular camera may have a 1080p imaging resolution.

The various sensors described herein may be suitable for use within an environment that the vehicle is traversing. In some embodiments, some sensor types may be more suited than others for operating in various environmental conditions. For instance, a first sensor type may be more suitable for use in a first type of environment and a second sensor type may be more suitable for use in a second type of environment. The first and second types of environments may have at least one differing environmental condition relative to one another. For instance, the first and second environmental types may have different lighting conditions. The first and second environment types may have different object densities, different types of objects, and/or different sizes of objects. The first and second types of environments may have different visibility ranges. The first and second types of environments may have different background noises or vibrations. The first and second types of environment may have different types or degrees of particulates in the air. The first and second types of environment may experience different temperatures. The first and second types of environment may experience different precipitation. For example, factors, such as rain, snow, hail, sleet, fog, smog, dust, wind, smoke, cloudiness, time of day, temperature, may affect the type of environment.

Sensors may be selectively turned on or off, or used for various environmental conditions. For example, a first sensor type may operate well in a first environment type and poorly in a second environment type. A second sensor type may operate well in a second environment type and poorly in a first environment type. A first sensor type may be configured to actively detect a region when the vehicle is operating in the first type of environment. The second sensor type may be configured to be passive or inactive when the vehicle is operating in the first type of environment. A second sensor type may be configured to actively detect a region when the vehicle is operating in the second type of environment. The first sensor type may be configured to be passive or inactive when the vehicle is operating in the second type of environment. In some embodiments, the first sensor type, the second sensor type, or both may be configured to collect data as the vehicle is moving through the first and second types of environments. In one example, the data from the first type of sensor is processed and the data from the second type of sensor is not processed when the vehicle is moving through the first environment type. The data from the second type of sensor may be provided and the data from the first type of sensor may not be processed when the vehicle is moving through the second environment type. Data from one or more types of sensors may or may not be processed or analyzed depending on the environment type within which the vehicle is operating and the suitability of those sensor types for that environment type. In some embodiments, some sensors may be capable of operating in multiple environment types. Such sensors may be collecting data and/or processing/analyzing data while the vehicle is operating in the multiple environment types.

In some embodiments, one or more sensors on-board a vehicle may detect the type of environment that the vehicle is operating in. In other embodiments, data from outside the vehicle may be used to determine the environment that the vehicle is operating in. For instance, data from an external sensor of the vehicle may be used to collect information about the environment. Online data sources, such as weather reports, may be used to determine environmental conditions. In some embodiments, external data sources may be used in combination with a map of an environment that the vehicle is navigating to determine the environment type. The environment type may be changed over time, when the vehicle is moving or stationary. The environment type information may be updated periodically.

In response to detecting the environment type, an assessment may be made of the suitability of one or more sensor types for operating within the detected environment type. In some embodiments, when one or more sensors are determined to be suitable to operate within the detected environment type, they may be used to actively collect data. The data collected by the sensors may be processed and/or analyzed. When one or more sensors are determined to be unsuitable for operation within the detected environment type, they may be inactive or used to passively collect data. In some embodiments, they may collect data, but the data may not be processed and/or analyzed. In some cases, the data that is processed and/or analyzed may be discounted or weighted less than data from sensors that are suitable for the environment.

As an example, the right side of FIG. 5 shows the vehicle 501 deployed with a vision sensing system comprising a plurality of vision sensors including, e.g., binocular cameras and at least one monocular camera. A plurality of vision sensors #1, 2, 3, 4, 6, 7, 8, 9 and 10 are supported on different sides (e.g. front, rear and lateral sides) of the vehicle body. The vision sensors may have a same orientation or different orientations relative to the side of the vehicle to which they are mounted. For example, vision sensors #1, 2, 8 and 9 may be oriented at a predetermined angle (e.g. about 45 degrees) relative to the left and right sides of the vehicle body. Additionally or optionally, vision sensors #3 and 7 may be oriented at another predetermined angle (e.g. about 135 degrees) relative to the front side of the vehicle body. In some embodiments, the vision sensors may be rigidly coupled to the vehicle in a preset orientation. In other embodiments, the vision sensors may be capable of rotating about a vertical axis to change their orientations as described elsewhere herein. The change in orientations (optical axes) of the vision sensors may occur when the vehicle is moving or when the vehicle is stationary.

Each of the above vision sensors can be used collectively with one or more other vision sensors to form one or more binocular cameras. The vision sensors can be combined in different ways to form different binocular cameras for near and long range visual sensing, as described elsewhere herein. Accordingly, a plurality of binocular cameras can be configured and used to detect objects located at various distances from multiple sides of the vehicle. In some embodiments, a plurality of binocular cameras may be provided on different sides of the vehicle by combining the vision sensors in different configurations, as shown in the following table.

In some embodiments, different sets or combinations of binocular cameras may be selectively activated as the vehicle is moving through different types of environment (e.g., indoor, outdoor, densely-built areas, open areas, different terrains, altitudes, etc.). The binocular cameras may be selectively used or activated depending on the type of environment in which the vehicle is operating. For example, when the vehicle is moving through an environment that has a high object density (e.g., in a densely populated city), binocular cameras having near and/or intermediate sensing ranges may be selectively activated. Since surrounding objects are likely to be closer to the vehicle, there may not be a need to activate binocular cameras that have far sensing ranges in such an environment.

Conversely, when the vehicle is moving through an environment that has a low object density (e.g., in a sparsely populated city or open terrain), binocular cameras having far and/or intermediate sensing ranges may be selectively activated. Since surrounding objects are likely to be further away from the vehicle in such an environment, there may not be a need to activate binocular cameras that have near sensing ranges in such an environment.

In addition to the binocular cameras, the vision sensing system may also comprise a forward-facing monocular camera #5 mounted on the front side of the vehicle, and rearward-facing monocular camera #10 mounted on the rear side of the vehicle. For example, the forward-facing monocular camera #5 may have a higher imaging resolution (4K) and the rearward-facing monocular camera #10 may have a lower imaging resolution (1080p). The 4K image data can be used to detect objects that lie within a maximum predetermined distance (e.g. 200 m) from the front side of the vehicle. The 1080p image data can be used to detect objects that lie within another maximum predetermined distance (e.g. 100 m) from the rear side of the vehicle. Accordingly, the forward-facing monocular camera #5 can be used for monitoring the environment in front of the vehicle, and the rearward-facing monocular camera #10 can be used for monitoring the environment behind the vehicle. The 4K and 1080p image data can be polychromatic (e.g., RGB, CMYK, HSV) or monochromatic (e.g., grayscale, black-and-white, sepia). In some embodiments, one or more of the monocular cameras (e.g. forward-facing monocular camera) can be configured to capture color image data. Color images contain more information compared to monochromatic images. For example, different colors can aid in detecting the type and physical nature of objects (e.g., traffic sign posts, streets, roads, statues, animals, pedestrians, buildings, tunnels, constructions, etc.), which can be considered as label information as discussed herein or elsewhere in the specification. Objects such as pedestrians, other vehicles, man-made structures and obstacles can be detected by processing the image data using one or more visual detection algorithms as described elsewhere herein. In some embodiments, the color image data may be processed using one or more processors implementing an Artificial Neural Network (ANN) or a deep learning algorithm, which can be trained to more accurately identify the nature of objects progressively over time.

Figure 6:
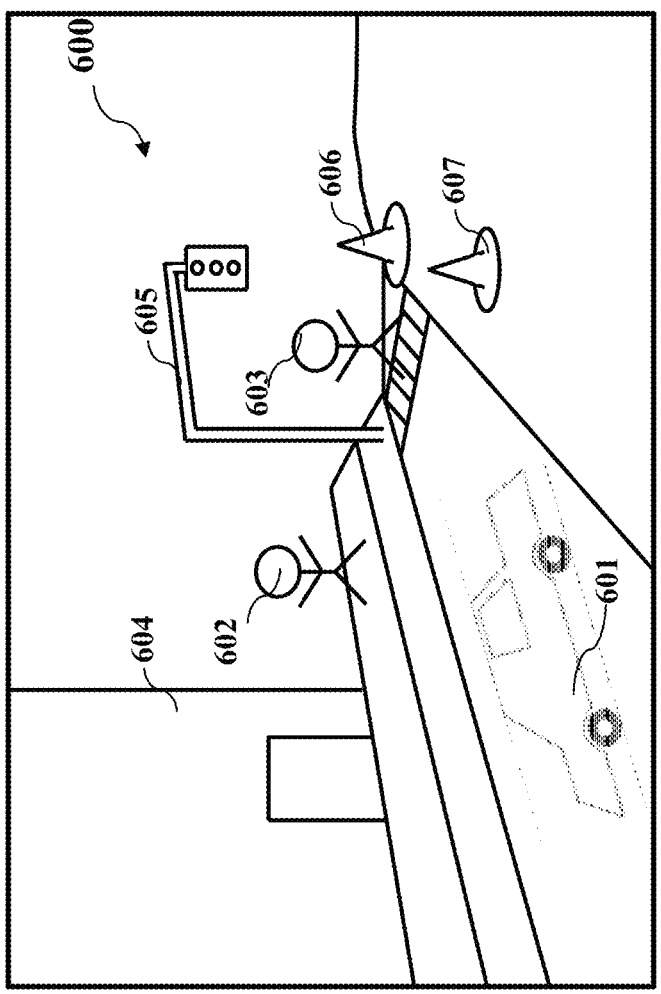
FIG. 6 shows an exemplary environment within which a vehicle may be operating, in accordance with embodiments of the disclosure.

FIG. 6 shows an exemplary environment 600 within which a vehicle 601 may be operating, in accordance with embodiments of the disclosure. It is to be understood the vehicle 601 herein may be equal to or similar to (or chare some characteristics with) the one as discussed before with respect to FIGS. 1-5 and elsewhere in the specification. Therefore, any descriptions of the vehicle made before and elsewhere can be equally applied to the vehicle 601.

In some embodiments, in order to sense the surrounding environment and collect data relating thereto, the vehicle herein may be deployed or mounted several types of sensors, such as those depicted in FIG. 5 with detectable ranges. For example, based on the vision sensors, the vehicle may recognize pedestrians 602 and 603, wherein the pedestrian 602 is walking along the side of the road while the pedestrian 603 is crossing the street. In this situation, the vehicle may pay more attention to the pedestrian 603 than to the pedestrian 602 since the pedestrian 602 is temporarily appearing in its route. In some cases, the vehicle may consider the pedestrian 603 as a temporary object in the collected image data. Therefore, if the vehicle herein is an autonomous vehicle, it may autonomously perform obstacle avoidance with aid of information derived from the 3D map existing at the remote server. For example, with aid of the label information from the remote server about this temporary object in the map, the vehicle may be instructed to reduce its current speed such that the pedestrian has enough time to cross the street, or stop a few seconds to let the pedestrian complete the crossing if necessary.

Further, based on the data collection, the image data and their locations regarding a building 604, a traffic light post 605 and some barricades 606 and 607 can also be obtained at the vehicle. These raw data can be further processed to accurately recognize the objects in the scene, which may also be marked or depicted in a 3D map, which can be generated using the SLAM system as discussed later with reference to FIG. 7. Objects may optionally be recognized using object recognition techniques. Based on the identified type of object, the object may be categorized or labeled. In some implementations, the objects may be categorized without necessarily being specifically recognized. Some examples of object categorization may include dynamic objects and static objects, or temporary objects and permanent objects.

In some embodiments, the objects in the map may comprise dynamic objects and/or static objects. The dynamic objects and/or static objects may be identified based on whether their locations or positions are changing or not. The dynamic objects and/or static objects may be identified using object recognition, which may determine whether the object is a type of object that is dynamic or static. For instance, a parked car may not necessarily be moving when the data is collected, but the object may be recognized and classified as a car, which is typically capable of motion. Dynamic objects herein may include objects capable of actively moving around. Dynamic objects may or may not include objects capable of being moved, such as moving objects, e.g., moving cars, pedestrians, temporary barricades. In some cases, the dynamic objects may include moving scenes or scenarios of activity, such as car accidents or road repairs. Static objects herein may include buildings, traffic sign post, landmarks, roads, streets, blocks and the like that stay stationary most of the time. When the dynamic objects or static objects are marked or identified in the 3D map, the label information can be transmitted to the vehicle for obstacle avoidance or navigation of the vehicle, or for both in some cases. For example, the information regarding the static objects can be used for navigation of the vehicle since the static objects are less active and more important than the dynamic objects in terms of navigating the vehicle. The dynamic objects may be useful for navigation since they can move around and may be present in the route of the vehicle. For instance, the number of dynamic objects may affect traffic within a region that is along the route or projected route of the vehicle. Optionally, dynamic objects may be useful for obstacle avoidance by the vehicle, which may optionally occur on-board the vehicle. Therefore, based on the label information about the dynamic objects, the vehicle may perform the obstacle avoidance to the dynamic objects if they are at risk of colliding with one another.

Alternatively or in addition, the objects in the map may comprise permanent objects, such as the building shown in FIG. 6 and temporary objects, such as the pedestrians and barricades shown in FIG. 6. Likewise, these objects should be taken into account when performing obstacle avoidance. Both static and temporary objects may be assessed when the vehicle performs obstacle avoidance. Additionally, in term of navigation, the location or presence of the permanent objects, such as traffic signs, traffic lights, roadblocks, or structures, may be given more weight since they may remain stationary when the vehicle is traveling along the path. In contrast, the temporary objects, such as repair, parked cars, or accidents, may disappear from the planned path sooner or later due to their higher mobility or randomness than the permanent objects. The presence and/or absence of temporary objects may be assessed with greater scrutiny when generating and/or updating the map, since there is a greater likelihood of change. In view of this, label information about the temporary objects such as roadblocks or pedestrians should be used for obstacle avoidance since they are more likely to collide with the vehicle than the permanent objects, such as buildings. In some embodiments, a static object may be a temporary object or a permanent object. For example, construction may be considered a temporary object while a building may be considered a permanent object. A dynamic object may be a temporary or permanent object. Most dynamic objects, such as cars, pedestrians, animals, etc., may be temporary objects that may come and go. In some instances, dynamic objects may be capable of motion but may be considered a permanent object (e.g., a train crossing bar which may lift and fall, but is permanently provided at a location).

Since the dynamic objects and static objects have different time or duration in terms of presence in the map, the information regarding the dynamic objects and the static objects can be given different terms of validity. For example, in some embodiments, the information about the temporary objects can be used for a limited length of time from the detection of the temporary objects for navigation of the vehicle. Alternatively, in some embodiments, information about the temporary objects may or may not be relied upon for navigation of the vehicle.

Figure 7:
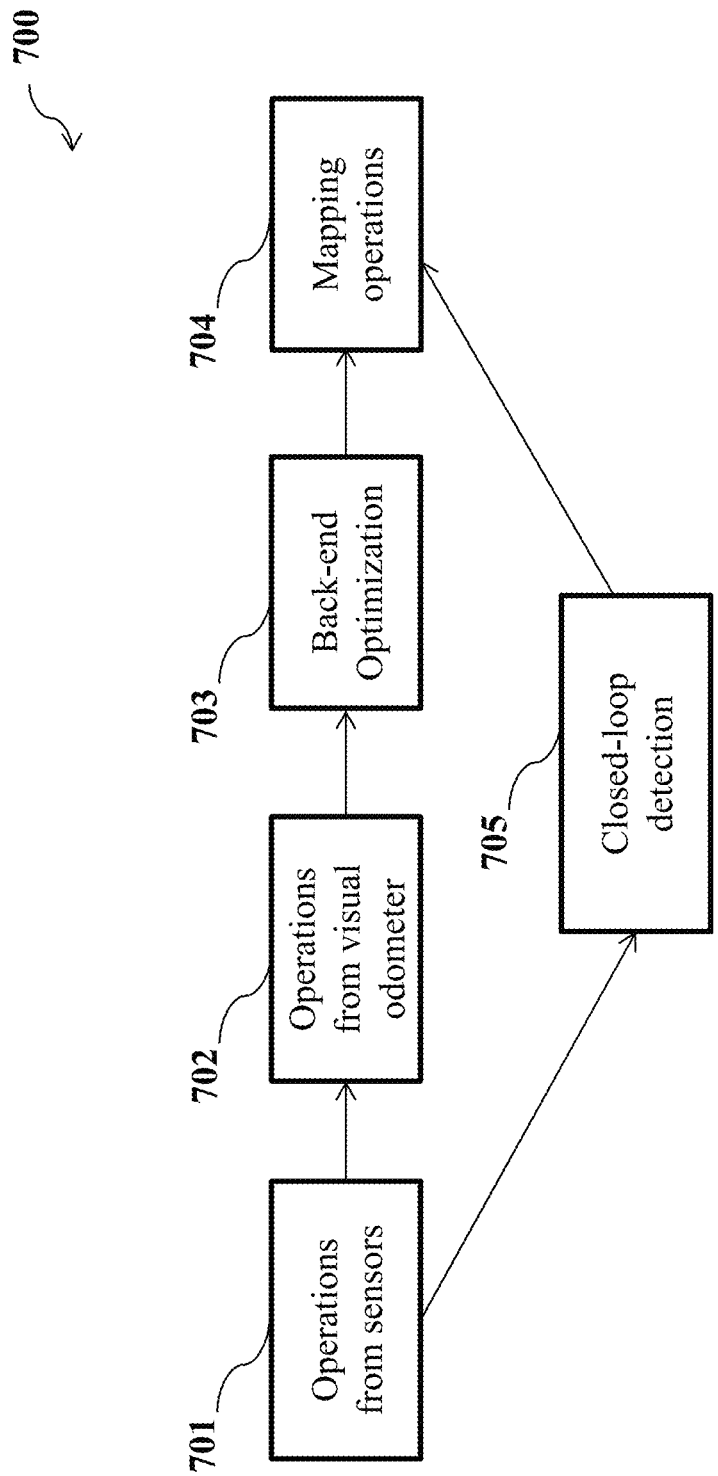
FIG. 7 illustrates an example of operations of a Simultaneous Localization and Mapping (SLAM) system that can be used with a vehicle, in accordance with embodiments of the disclosure.

FIG. 7 illustrates an example of operations of a SLAM system 700 that can be used with a vehicle (or a cloud server as necessary), in accordance with embodiments of the disclosure. In an example, the SLAM system can provide correction in calculations of a pose (translation or orientation) of the vehicle. For instance, by obtaining location information relating to a target, obtaining an image of the target, estimating, from the image of the target, measurements relating to a pose of the vehicle based on the image and location information, the SLAM can correct a pose determination of the vehicle based partially on the measurements relating to the pose of the vehicle. With aid of the SLAM system, the vehicle can determine its pose information relative to one or more degrees of freedom, for example, six degrees of freedom and thereby all the data including 3D point cloud data and image data collected by the vehicle can be transformed into the same coordinate frame. Further, with aid of the SLAM system, the vehicle can precisely and actively determine its own location and building a map by itself for navigation.

As illustrated in FIG. 7, the SLAM system 700 as utilized in the disclosure may begin with sensing operations of one or more sensors at 701, through which image data that is necessary for the SLAM system can be collected for subsequent processing. The sensors herein can be any suitable vision sensors as discussed above, such as Lidar sensors, monocular cameras or binocular cameras for image data collection and inertial sensors included in an inertial measurement unit (IMU) for motion measurement in one or more degrees of freedom.

Upon receiving the image and motion data from the sensors, a front-end odometer, which may also be referred to as "visual odometer," may determine the location or orientation of the cameras using the data from the sensors at 702. In an example, the visual odometer herein may be used to process a series of images or a video stream to determine a direction and a location of a camera. The determination process herein may include, after obtaining the images, performing distortion correction, feature detection and match. Alternatively, the visual odometer may directly match the corresponding pixels in the series of the images, and estimate the rotation matrix and translation vector of the camera based on Epipolar Geometry principle. In some embodiments, IMU, wheel odometers and GPS sensors may also provide information regarding the rotation and translation of the objects (e.g., cameras). Therefore, all these information can be fused to better estimate the movements and orientations of the object during a time period.

In some cases, if the rotation matrix and translation vector of a camera obtained by the visual odometer using visual odometry are both correct, then feasible positioning and mapping can be obtained. However, there may be noise in the collected data due to precision of the sensors and erroneous match, and thus the result of the rotation matrix and translation vector may be obtained with errors. In some cases, a new image frame is only compared with a previous image frame and therefore, if a result associated with a frame is erroneous, it may cause accumulated errors to the subsequent result, thereby rendering the final result significantly erroneous. To address this issue, the back-end optimization at 703 is introduced, based on which the information regarding the pose of the camera and information regarding the closed-loop detection can be optimized to get a globally-uniform trajectory and map at 704. In some embodiments, the optimization herein can be carried out using bundle adjustment ("BA"), Kalman filtering (EKF), or graph optimization, wherein the graph optimization can achieve the best performance and result for the back-end optimization.

Although the results subject to the back-end optimization are better than those without back-end optimization, a closed-loop detection at 705 can be additionally used for a situation in which the vehicle moves back to somewhere it went before and the key frames collected at that moment can be used for comparing, thereby obtaining a better and more efficient result than merely using the back-end optimization. In some cases, the closed-loop detection can be implemented in two different approaches. One approach is to determine whether it is near or adjacent to a previous location based on the estimated location of the camera. Another approach is to automatically discern that the current scene has been visited before based on the images and to identify the key frames at that moment. The latter seems more popular at present and indeed is an unsupervised pattern recognition technique. Some commonly-used algorithms, such as a Bag-of-Words (BOW) and ORB-SLAM, apply this approach to perform the closed-loop detection.

In operation, to achieve the localization of the vehicle, the visual odometer may continue to determine the current pose (or attitude) of the vehicle and changes in the pose relative to the previous moment. Sequentially, the back-end optimization will optimize the errors and noise accumulated from the front-end processing, thereby ensuring a more accurate positioning. The closed-loop detection can identify the scene to which the vehicle has moved before (that is, the scene existing in the map), and then optimize the trajectory that the vehicle moved along before.

Based on the estimation with respect to the trajectory, a map corresponding to a given task can be established, i.e., mapping operations in the SLAM system. The map herein can be a 2D or 3D map based on a specific task as preferred by the users or dependent on the hardware conditions, for example, the types of the sensors. In some embodiments, a 3D map can be established locally at the vehicle using the SLAM system. The 3D map may include but is not limited to 3D point cloud or 2D image data. In some instances, the map may include and further mark lane lines, traffic signs, buildings and their service natures, such as supermarkets for shopping or restaurants for dinner, road features (driving directions) and other relevant information. As noted previously, all these data, together with time information regarding when these data are collected or formed, can be formatted into one or more data package, such as 4G data packets, and transmitted to the cloud server for generating a high-precision 3D map at the cloud side. In some embodiments, a SLAM system similar to the one as discussed herein can be established at a cloud side, for example, in the cloud server. Therefore, a 3D map with higher precision based on the data collected by the vehicle can be generated at the cloud server using the SLAM system.

Figure 8:
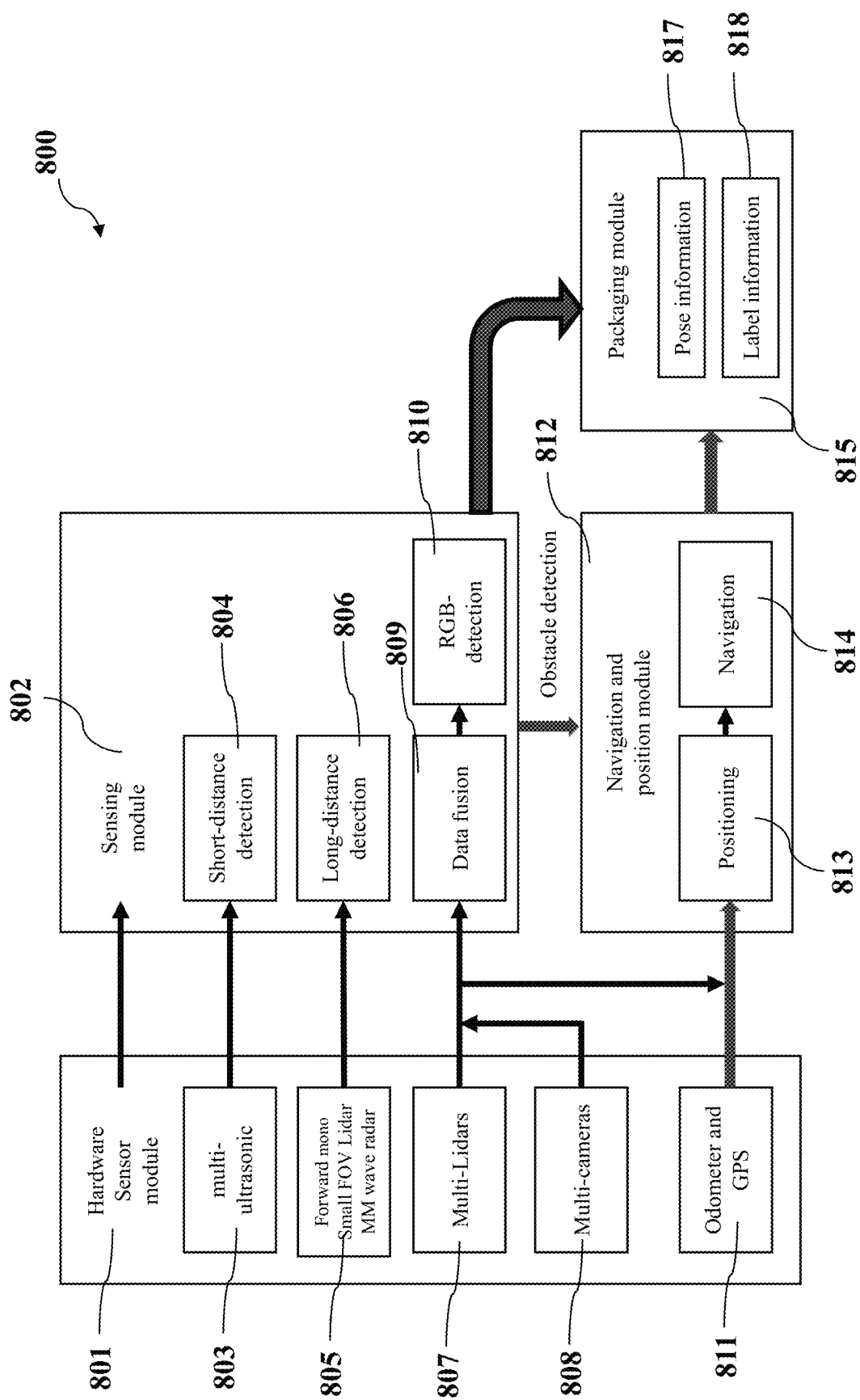
FIG. 8 illustrates a schematic block diagram of a data collection system at a vehicle, in accordance with embodiments of the disclosure.

FIG. 8 illustrates a schematic block diagram of a data collection system 800 at a vehicle arranged with multiple sensors and corresponding operations thereof, in accordance with embodiments of the disclosure. The vehicle herein may be equal to or similar to (or share some characteristics of) the ones as discussed before with reference to FIGS. 1-7 and elsewhere in the specification. Therefore, any descriptions of the vehicle as made before can be equally applied to the vehicle discussed herein.

As illustrated in FIG. 8, the data collection system 800, among other things, may comprise a hardware sensor module 801, a sensing module 802, a navigation and position module 812, and a packaging module 815, in accordance with some embodiments. The hardware sensor module may correspond to the sensing assembly or sensors described elsewhere herein. For example, the hardware sensor module may include a first group of sensors 803 for proximity or short-distance detection, and a second group of sensors 805 for long-distance detection. The first group of sensors may include, for example one or more ultrasonic sensors coupled to multiple sides of the vehicle, thereby enabling the scanning of the surrounding environment in various directions. The ultrasonic sensors may be configured to adjust its orientation to change its direction and scan area, so as to adequately sense the area proximate or surrounding the vehicle. The ultrasonic sensors can also scan areas that lie in the "blind" spots of the second group of sensors. The second group of sensors may include, for example a forward monocular camera, a long range lidar, and a millimeter-wavelength radar as described elsewhere herein. The sensor module may also include multiple lidar units 807 provided in groups located around the vehicle, and multiple binocular cameras 808. The lidar units may be single-channel lidar units or multiple-channel lidar units. Additionally and optionally, the sensor module may include an odometer 811-1 for visual odometry-related operations and a GPS sensor 811-2 for positioning operations.

The sensing module 802 may receive the data from the hardware sensor module 801 in an asynchronous and Publish/Subscribe manner. The sensing module may include one or more submodules that subscribe to data collected by the sensor module 801. The sensors in the sensor module 801 may be configured to automatically send data to the corresponding subscribed sub-modules. For example, the ultrasonic sensors in the first group of sensors may send data to a submodule 804 for detecting objects that are proximal or adjacent to the vehicle. Similarly, the forward monocular camera, long range lidar, and millimeter-wavelength radar in the second group of sensors may send data to another submodule 806 for detecting objects that are distant to the vehicle.

The multiple lidar units and binocular cameras may send data to a submodule 809 which fuses the data into a set of RGB-D data. The RGB-D data is then provided to a detection submodule 810 configured to analyze the RGB-D data to detect obstacles in the environment. In some instances, the multiple lidar units may be configured to recognize the objects within the surrounding environment based on the collected point cloud data and the multiple cameras may be configured to recognize the objects within the surrounding environment based on the collected image data. The data with respect to the recognized objects respectively from the lidar units and cameras may be fused with one another by the submodule 809. Then, the detection submodule 810 may be further configured to analyzed the fused data to detect potential obstacles in the surrounding environment.

One or more submodules in the sensing module 802 may be configured to provide the obstacle detection information to the navigation and position module 812. The navigation and position module may comprise a position submodule 813 for determining a plurality of positions and pathways for avoiding the obstacles so as to safely navigate the vehicle within an environment, based on the obstacle information obtained by the sensing module, along with real-time data from the visual odometer and GPS sensor. The position submodule then sends the plurality of positions and pathways to a navigation submodule 814 configured to control autonomous driving of the vehicle based on the plurality of positions and pathways.

In some embodiments, a plurality of sensors may be used to collect information about a vehicle. The plurality of sensors may comprise a plurality of sensor types, such as any combination of the various sensor types described elsewhere herein. For example, a first sensor type may be a vision sensor while a second sensor type may be lidar units. However, any combination of different sensor types may be provided. In some embodiments, data from a first sensor type may be fused with data from a second sensor type. The fused data from the first and second sensor types may be subsequently used for detection about a vehicle.

In another example, data from the first sensor type may be used for detection about a vehicle, and data from a second sensor type may be used for detection about a vehicle. This detection data may then be fused to come up with a master detection about a vehicle.

In some embodiments, weights may be assigned to data from the first sensor type and/or the second sensor type. The weight might depend on suitability of the sensor type for operation within an environment type within which the vehicle is operating. For example, if a first sensor type is more suitable for the environment that the vehicle is operating than the second sensor type, then the data from the first sensor type may be weighted more than the data from the second sensor type. In some embodiments, if data from a particular sensor type is not at all suited for operation within the environment, the data from the sensor type may be weighted at zero, or another low value. The data may be weighted prior to or after fusing the data. The data may be weighted prior to or after detection about the vehicle.

For any number of data from any number of sensor types (e.g., 1, 2, 3, 4, 5, 6, 7, 8, or more), the data may be fused before detection occurs, or afterwards. Data from any number of sensor types may be weighted. They may all be weighted together at the same time, or sequence.

The data from the lidar sensors (e.g. single or subsets of lidar units) and the data from vision sensors (e.g., binocular cameras or monocular cameras) can be processed using at least one or more of the following sensor fusion techniques. In some embodiments, the data from the lidar sensors and the vision sensors may be first fused together, and then the fused data can be used for obstacle detection and/or recognition of the surrounding environment.

In some other embodiments, some portion of the obstacle detection may occur prior to sensor fusion. For example, the data from the lidar sensors may be individually used to detect obstacles, and the data from the vision sensors may be individually used to detect obstacles. The obstacles may or may not be the same, of the same type, or at the same distance from the vehicle. An environmental map, such as a 2D or a 3D map, may then be created by fusing together information about the obstacles detected respectively by the lidar sensors and the vision sensors, for example, via a SLAM algorithm as discussed above with respect to FIG. 7. One or more processors may be configured to determine characteristics of the obstacles from the environmental map, and correlate or corroborate the obstacles detected by the respective lidar sensors and vision sensors. In some embodiments, the one or more processors may be configured to determine if the data from each of the lidar sensors and vision sensors is reliable. For example, under foggy conditions, if visibility is determined to fall below a threshold based upon image data collected by the vision sensors, the data from the vision sensors may be deemed unreliable, and may not be used in the sensor fusion (or alternatively, assigned a low weight in the sensor fusion). Under these foggy conditions, only the data from the lidar sensors may be used for obstacle detection. This may correspond to a first condition in which the data from the vision sensors is assigned a weight of 0 (minimum), whereas the data from the lidar units is assigned a weight of 1 (maximum). In another example, if visibility is determined to be above the threshold, the data from the vision sensors camera can then be used. Under such circumstances, the lidar sensor data and vision sensor data can each be used to detect obstacles, and the detected obstacles can then be fused together in an environmental map. The processors can be configured to determine a veracity (or accuracy) of the detected obstacles based on the fused data or environmental map.

In some embodiments, the data from the various sensors may be mapped onto a 3D point cloud. One or more processors may be configured to continuously monitor the point cloud to determine whether points in the cloud are due to noise, or come from a same object/obstacle. The processors may be configured to track one or more points, and their spatial locations within the point cloud. For example, if the processors is tracking a particular point or cluster of points and determine that duration of those point(s) in the point cloud is less a predefined time threshold, the processors may then classify those point(s) as noise and exclude them from further analysis. In some embodiments, the processors may assign a rating to objects in the point cloud based on the duration of their appearance in the point cloud. Objects appearing for brief time periods may be assigned a lower rating compared to objects appearing for longer time periods. In some embodiments, the rating of an object can also be determined by comparing the object from the point cloud to a set of known object models. For example, an object that closely matches a known model may be assigned a higher rating, whereas another object that less closely matches the known model may be assigned a lower rating. The rating of an object in the point cloud may be used to determine whether the object is in fact a real physical object, as well as the object type. In some cases, objects that have a rating greater than a first predetermined rating may be classified as real physical objects, whereas objects that a rating less than a second predetermined rating may be classified as noise data. In some embodiments, certain objects may have ratings that fall in between the first and second predetermined ratings. In those embodiments, the identification of those objects may be ambiguous, and the processors may be configured to continue monitoring those points over time to establish whether they correspond to real physical objects or noise data. In some cases, one or more sensors may be configured to collect more data on those objects or points that are deemed to be ambiguous.

In some embodiments, the sensing module 802 may send label information 818 regarding the objects recognized in the surrounding environment to the packaging module 815. In some embodiments, the label information herein may comprise classification information or motion information (e.g., motion speed) of the recognized objects. The packaging module herein is able to package the data into data packages complying with a specific format or protocol as required by the communication network, such as required by a 4G network. The data package herein may also include pose information 817 of the vehicle, such as obtained via sensors included in the IMU. In some cases, the positional or navigational information of the vehicle may also be sent from the navigation and position module to the packaging module and thereby this information can also be packaged into the data packet. It should be noted that the information included in the data package herein is only for illustrative purposes and other information, which is considered as necessary for generating a high-precision 3D at the cloud server, may also be included in the data package. For example, timestamp information associated with image data collected by the lidar sensor and cameras, or position information captured by the GPS sensors can also be packetized via the packaging module and transmitted to the cloud server.

The above has described some modules and operations with regard to the data collection system in accordance with the embodiments of the disclosure. However, it should be understood that the modules as depicted in FIG. 8 are only for illustrative purposes and the data collection system in accordance with the embodiments of the disclosure should not be limited thereto. Further, it is apparent that the modules as depicted in FIG. 8 can constitute a stand-alone system, such as an autonomous driving system, that can be implanted into any existing or future-developed autonomous vehicle, such as autonomous ground vehicle or autonomous aerial vehicle.

Figure 9:
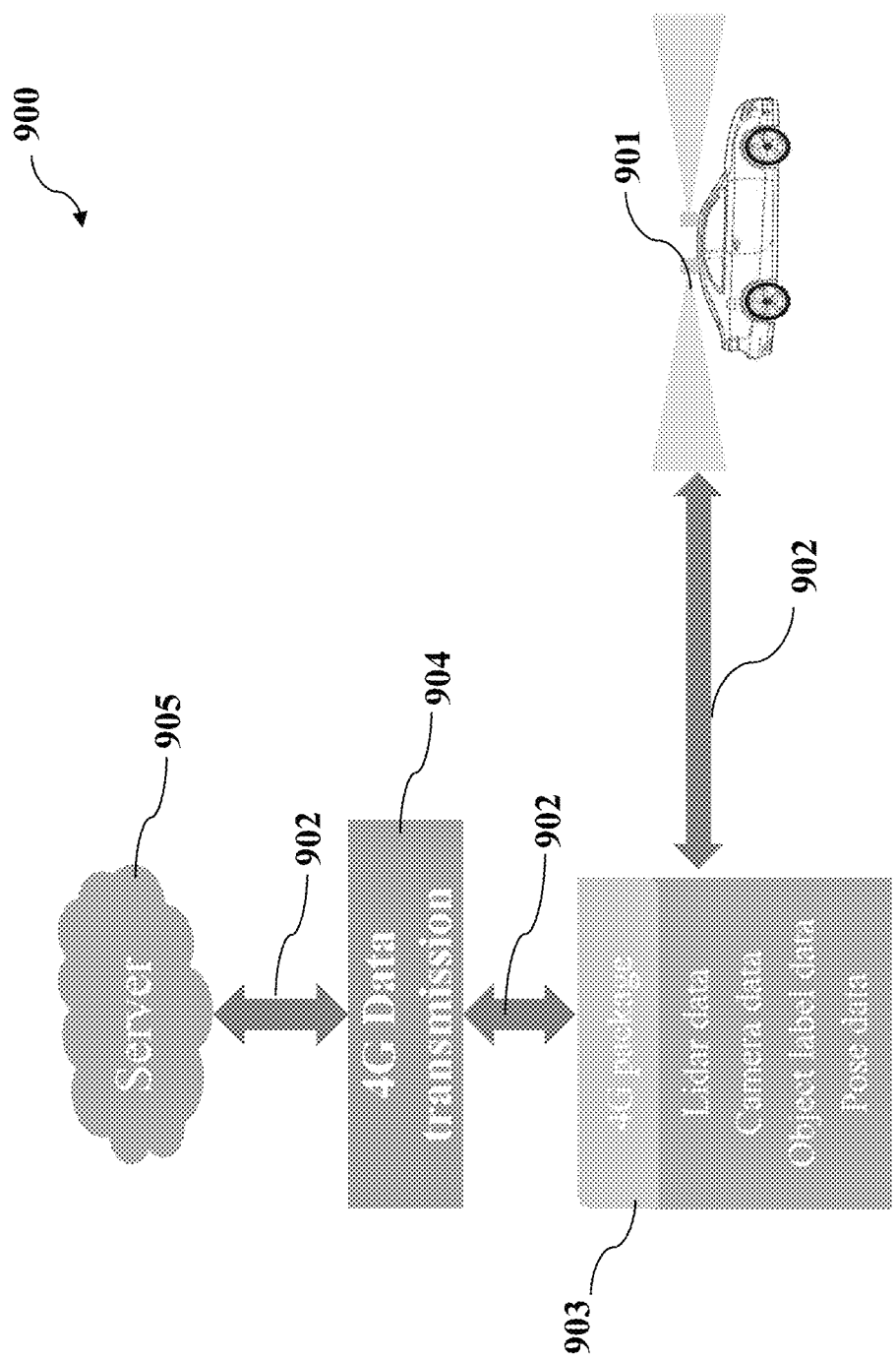
FIG. 9 shows an exemplary scenario of data transmission between a vehicle and a remote server, in accordance with embodiments of the disclosure.

FIG. 9 shows an exemplary scenario of data transmission between a vehicle 901 and a remote server 905, in accordance with embodiments of the disclosure. In some embodiments, the vehicle 901 and the remote server 905 herein may be equal to or similar to (or share some characteristics of) the vehicle and server (e.g., a cloud server) as discussed before with respect to FIGS. 1-8. Therefore, any descriptions of the vehicle and remote server as discussed before may also be equally applied to the vehicle and remote server as discussed below with reference to FIG. 9.

As illustrated in FIG. 9, a vehicle 901 may be traveling on a roadway, which may optionally have one or more lanes and/or lane dividers, and may sense an environment within which it is operating and collect the corresponding data with aid of one or more sensors. The one or more sensors may have a detectable range and may be capable of detecting environmental features, such as curbs, walkways, edges of lanes, medians, obstacles, traffic lights, traffic signs, traffic cones, railings, or ramps.

In some embodiments, after collecting the data about the environment, the vehicle may optionally pre-process the data before sending it out. As discussed before, the pre-processing herein may include identifying or detecting the objects present in the environment. To this end, a database for potential target objects, including, e.g., traffic lights, traffic signs, or landmarks, can be established beforehand. Then, one or more objects in the environment, which have been captured by image sensors, can be identified from the images based on the database using well-trained deep learning models. As an alternative, the 3D point cloud data as captured by the lidar sensors can be transformed into a coordinate frame of the camera. Thereby, the objects in the 3D point cloud data can also be identified using well-trained deep learning models. In some embodiments, label data associated with the objects identified in the environment and pose data associated with the vehicle can also be obtained subsequent to corresponding data collection.

In some embodiments, the vehicle may use the collected data to localize itself. For example, after collecting the 3D point cloud data in the current scene, the vehicle, with aid of one or more processors, finds out static scene data such as landmarks and the buildings. Then, by means of e.g., an iteratively closest point (ICP) algorithm, the vehicle may try to match the static scene data with the data in a corresponding area of the map generated e.g., via a SLAM system. Then, six degrees of freedom of the vehicle can be determined from the matched data, thereby obtaining the current location of the vehicle.

Alternatively, the vehicle may take pictures in each direction of the current scene and find out the corresponding data stored in the map through the feature point matching. Since the information, such as the 3D data of the feature points stored in the map and viewing angle of the imaging, is known, the location of the vehicle at the current moment can also be determined using Perspective-n-Point or other algorithms.

In some cases, the pictures, binocular depth data and 3D point cloud data collected by the vehicle with aid of sensors can be fused and the lane lines, traffic signs, shop location and other information can be extracted therefrom. By comparing the objects with those corresponding objects in the map and determining the relative geometric relationship between target objects that are matched, the location of the vehicle can also be determined.

Having obtained the data helpful for generating a 3D map or maintaining a previously-stored 3D map at the remote server, the vehicle may transmit the data, which can be packetized into 4G data packages, via a wireless communication link 902. As shown at 903, the 4G packet on the communication link may include various types of data, including but not limited to lidar data (e.g., 3D point cloud data), camera data (e.g., image data), object label data (e.g., regarding classification or motion information of the objects) and pose data (e.g., regarding the vehicle's orientation relative to six degrees of freedom).

Upon receipt of the data from the vehicle, the remote server 905 is capable of generating a 3D map with high-precision or updating an existing map using the received data. For example, the remote server may be able to generate the 3D map based on the received data using a SLAM system. During the generation of the 3D map, the pose information of the vehicle in the world coordinate frame can be determined using the SLAM system. Thereby, the 3D point cloud data and image data captured by the sensors on the vehicle can be transformed from the vehicle's coordinate frame to a world coordinate frame to form a 3D map. As an example, the point cloud data can be transformed into the world coordinate frame using the following equation (1):

$$P_{world}\begin{pmatrix}x\\y\\z\end{pmatrix} = T_{world,car} * P_{car}\begin{pmatrix}x\\y\\z\end{pmatrix} \quad (1)$$

$$P_{car}\begin{pmatrix}x\\y\\z\end{pmatrix}$$

In the above equation (1), denotes point cloud data captured by the sensors on-board the vehicle; $T_{world,car}$ denotes a transformation matrix which can be obtained by determining the location and pose of the vehicle in the world coordinate frame using the SLAM system. In this manner, the 3D point cloud data can be projected into the world coordinate frame, thereby forming a 3D map under the world coordinate frame.

In an example, 3D point cloud data can be transformed into a camera coordination frame first using the following equation (2):

$$P_{cam}\begin{pmatrix}u\\v\end{pmatrix} = T_{project} * T_{cam,lidar} * P_{lidar}\begin{pmatrix}x\\y\\z\end{pmatrix} \quad (2)$$

$$P_{lidar}\begin{pmatrix}x\\y\\z\end{pmatrix}$$

In the above equation (2), denotes point cloud data captured by the lidar sensors; $T_{cam,lidar}$ denotes a transformation matrix between the camera coordinate frame and the vehicle coordinate frame and can be predefined before delivery off the factory; $T_{project}$ denotes a projection matrix for projecting the 3D point cloud into the camera coordinate frame. Thereafter, the image data in the camera coordinate frame can be further transformed into the world coordinate frame, thereby forming a 3D map under the world coordinate frame.

In some embodiments, having transformed the image data including the 3D point cloud data into the world coordinate frame and formed a 3D map or a portion thereof, the remote server may compare the newly-generated map or its portion with a previously-stored map and may update the previously-stored map if necessary. For example, if the remote server keeps generating the same map or the same portion thereof, which is different from the previously-stored map or portion thereof, it probably means that the previously-stored map or its portion is incorrect or out of date. Therefore, the remote server may replace the previous map or its portion with the newly-generated map or the portion thereof. Alternatively, the remote server may replace the portion of the previous map with the new corresponding portion, without replacing the whole map. In some embodiments, the remote server may evaluate the received data and give it a confidence measure. Once the confidence measure is equal to or greater than a predefined threshold, the remote server may replace the previously-stored map or its portion with the newly-generated map or portion thereof, as will be discussed later with reference to FIGS. 10 and 11.

In addition to generating the 3D map or maintaining it, the remote server may also transmit information useful for navigation to the vehicle via the communication link, wherein the information can be derived from the 3D map. In an example, the information useful for navigation may comprise a subset of the 3D map within which the vehicle is operating and therefore the vehicle may use this subset of the 3D map as a local map for navigation or path planning. In another example, the information herein may comprise one or more commands, such as navigational commands, for the vehicle to follow. In some instances, the one or more commands may comprise a command for the vehicle to modify its route to a specified destination, for example, while the vehicle is en route to the specified destination.

In some cases, the information useful for navigation can be used by the vehicle to autonomously travel to a specified destination. Further, the information useful for navigation can also be used by the vehicle to perform the obstacle avoidance or calibrate the location of the vehicle. In some cases, the remote server may transmit the information derived from the 3D map such that the vehicle may use the information to update its local map, which can be provided by the manufacture of the vehicle before delivery or can be provided using the SLAM system at the vehicle.

Figure 10:
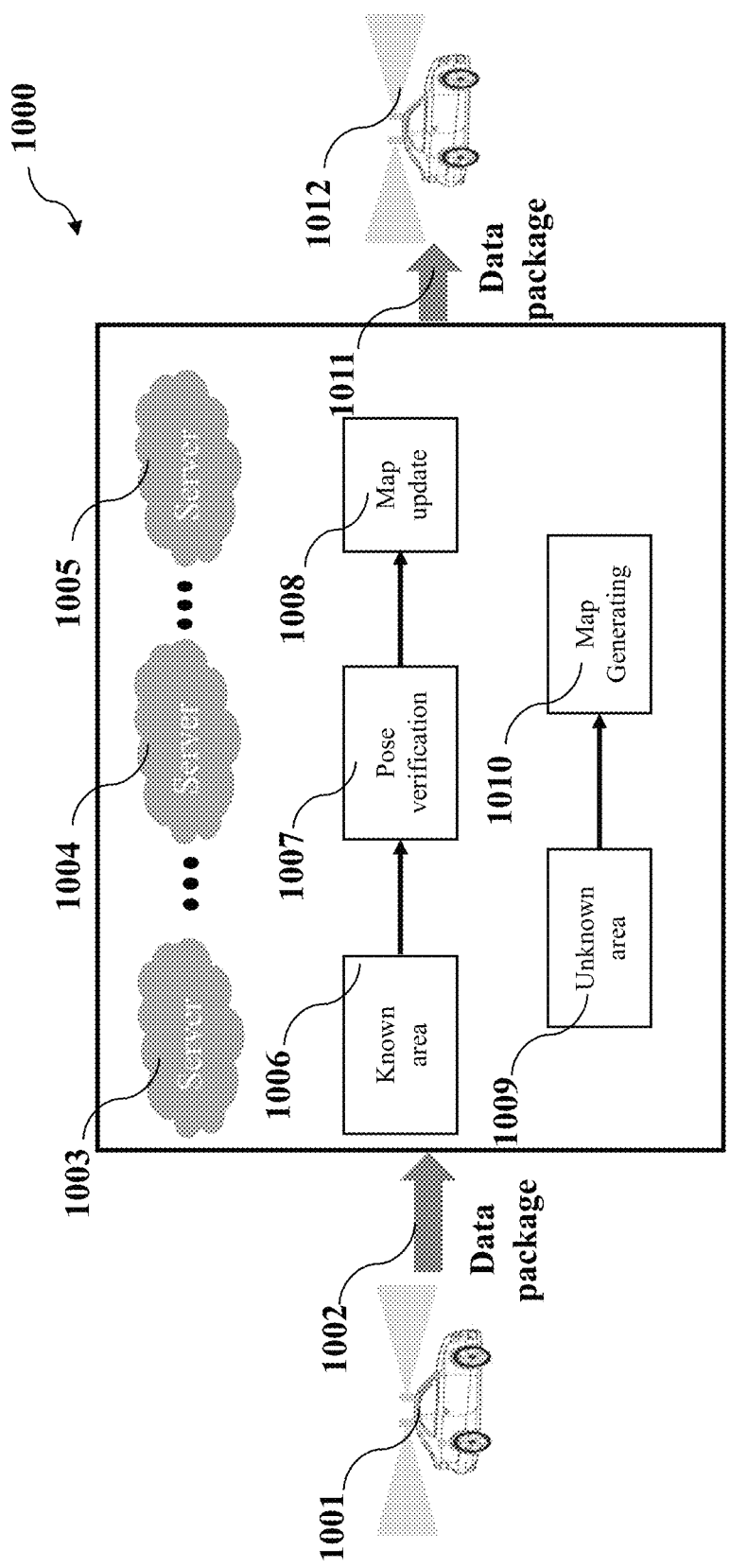
FIG. 10 illustrates a schematic block diagram of map processing at a remote server, in accordance with embodiments of the disclosure.

FIG. 10 illustrates a schematic block diagram of map processing 1000 at a remote server, in accordance with embodiments of the disclosure. It is to be understood that the remote server and vehicle herein may be equal to or similar to (or share some characteristics with) the remote server and vehicle as discussed before with respect to FIGS. 1-9. Therefore, any descriptions of the remote server and vehicle as made before can be equally applied to the remote server and vehicle as discussed below.

As illustrated in FIG. 10, the vehicles 1001 and 1012 may collect data with aid of one or more sensors on-board the vehicles and transmit the collected data, which may have been subject to pre-processing, to the remote servers 1003, 1004, and 1005 via a communication link 1002. As discussed before, the pre-processing herein may include feature recognition, feature match, or object identification or any other image processing as envisaged those skilled in the art based on the teaching of the specification.

Upon receipt of the data about the environment, the server may determine, at 1006, whether the vehicle is being driven within a known area. For example, based on the position information in the collected data, the remote server may be able to determine the presence of the vehicle in the known area if the position information is found in the previously-stored map or matches with the location in the previously-stored map. In other words, the vehicle is now traveling in an area that has been already recorded or depicted in the 3D map. Then, in some cases, the remote server may perform pose verification at 1007. In this case, the remote server may compare the images associated with the pose information of the vehicle with those in the previously-stored map. If the comparing result indicates that there is a significant difference therebetween, for example, the same images with different poses, then calibration information with respect to this comparing result regarding the differences will be generated. In some embodiments, the calibration information will be transmitted to the vehicle which may calibrate its pose based on the comparing result. For example, the vehicle may adjust its driving directions, its location, or scan directions and ranges of the sensors. In some cases, if the comparing result indicates the collected pose information match with those in the previously-stored map, then the remote server may transform the 3D point cloud data into the world coordinate frame and update or maintain the previously-stored map using the transformed 3D point cloud data at 1008. In some embodiments, the remote server may determine some scenes have changed based on the received data, for example, barricades, accidents or repairs newly appearing in the scene. Therefore, the remote server may update the previously-stored map and also share these changes to other vehicles. For example, the remote server may transmit these updates or changes to other vehicles via the communication link 1011 for navigation or path planning.

In some embodiments, if it is determined that the vehicle is traveling in an unknown area, i.e., the current location of the vehicle is not found in the previously-stored map at 1009. Therefore, the remote server may generate a 3D map regarding this unknown area using a SLAM system at 1010. For example, regarding the 3D point cloud data captured by the lidar sensors, it can be directly transformed into the world coordinate frame and therefore constituted a 3D map. Regarding the image data captured by the cameras, the point cloud data corresponding to the image data can be determined first and then both point cloud data and the RGB information corresponding to the point cloud data can be stored together for generating a 3D map. Alternatively or additionally, once the pose information of the vehicle with respect to six degrees of freedom in the world coordinate frame is obtained, images captured correspondingly to different poses of the vehicle can also be stored for generating a 3D map.

Figure 11:
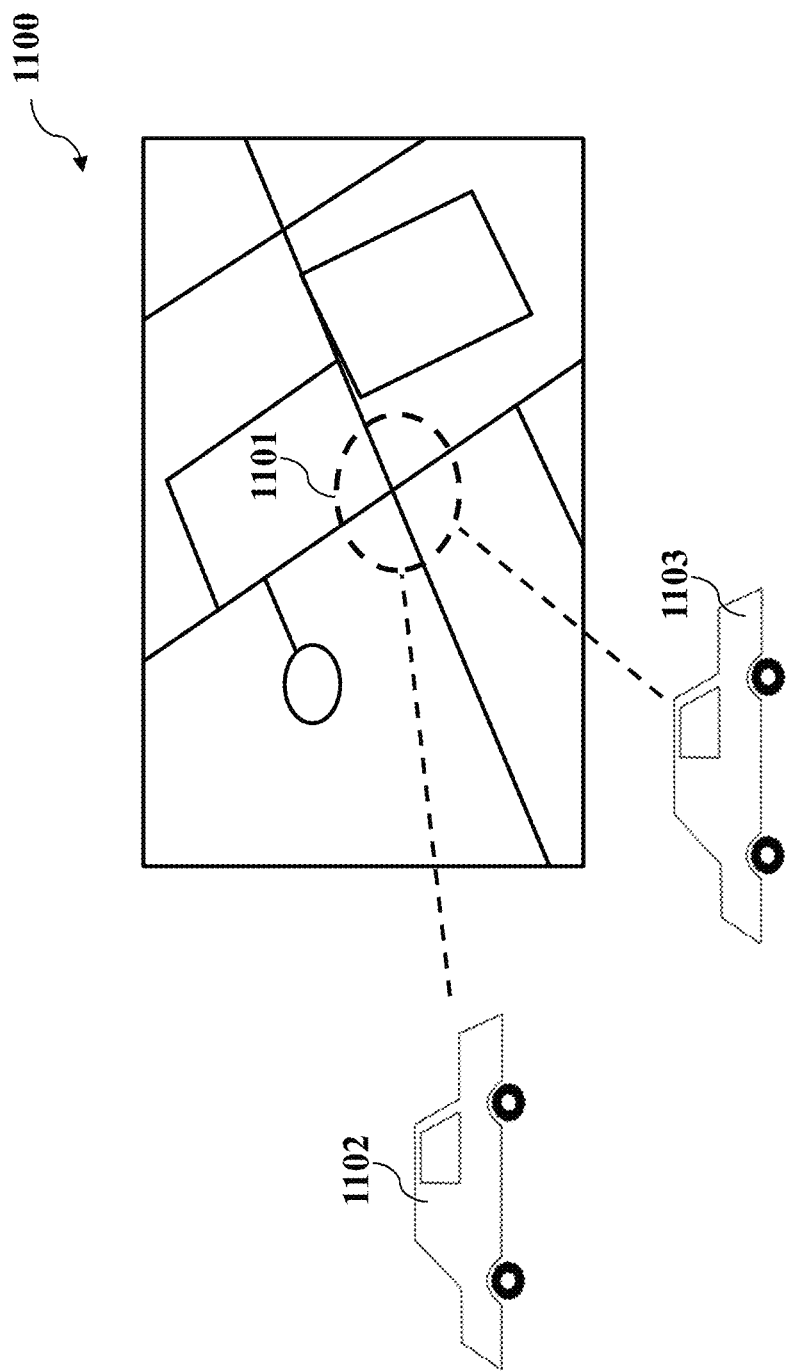
FIG. 11 illustrates an exemplary scenario in which multiple vehicles collect data associated with a same portion of a map, in accordance with embodiments of the disclosure.

In some embodiments, during the generating of a 3D map, the remote server may add a confidence measure to each part or some parts of the map, such as an area 1101 in a portion of a map shown in FIG. 11, which illustrates an exemplary scenario in which multiple vehicles collect data associated with a same portion of a map, in accordance with embodiments of the disclosure. In other words, the remote server may associate a confidence measure to the data that is used for generating a portion of the 3D map. Since different vehicles may provide respective data with respect to the same portion of the 3D map, in some cases, the remote server may determine a degree of similarity between the data provided by one or more vehicles for generating the same portion of the three-dimensional map.

A confidence label may be provided for data from individual vehicles, without regard to other vehicles. A confidence measure may be provided for a portion of a map based on data from multiple vehicles (e.g., conflict in data vs. reinforcement in data).

A confidence label may be provided for data from individual vehicles. The data from the vehicles may have a confidence label based on conditions of the vehicle and/or the environment. For example, it may be previously determined that one or more sensors of a particular vehicle are not working well or may need to be recalibrated. For instance, based on previous data, it may be determined that an ultrasonic sensor of the vehicle is not working well, so any data from that sensor may have a lower confidence level. In another example, it may be known that a vehicle was recently in an accident. This may cause the sensors to be damaged, and data from that vehicle may be given a lower confidence level. In some instances, environmental conditions may affect operation of one or more sensors. If an environmental condition is detected that may reduce the accuracy of a sensor, the data from that sensor may have a lower confidence level. For instance, if a particular sensor type does not work well in foggy conditions, if foggy conditions are detected, data from that sensor type may be given a lower confidence level.

The vehicle may provide information that is used to generate a map of the area. If the vehicle is the only vehicle contributing for that area, the data from the vehicle may be used to generate the map. The confidence label for the vehicle may be used to determine a confidence measure for that map. For instance, if the confidence label indicates a high level of confidence for the vehicle providing the information to the map, that location of the map may have a high confidence measure. Fir the confidence label indicates a low level of confidence for the vehicle providing the information to the map, the location of the map may have a low confidence measure.

In some instances, multiple vehicles may be providing information of the same area or object of a map. The confidence levels of the information from the multiple vehicles may be assessed and/or compared. The information with the higher confidence level may be used to contribute to the map. For example, if Vehicle A has a confidence level of 50, Vehicle B has a confidence level of 93, and Vehicle C has a confidence level of 80, the information from Vehicle B may be used to contribute to the map. In some instances, all the data may be used or averaged, but may be weighted based on their confidence level. For instance, the data from Vehicle B may be given greater weight than the data from Vehicle C, which may be given greater weight than the data from Vehicle A.

A confidence measure may be provided for a portion of a map based on data from multiple vehicles (e.g., conflict in data vs. reinforcement in data). The data from the multiple vehicles for the same area may match one another. This may provide an increased confidence measure since information from one vehicle was verified by one or more other vehicles. The data from multiple vehicles may conflict with one another. Depending on the data, this may provide a decreased confidence measure. For instance, if Vehicle A and Vehicle B present conflicting data, it may be uncertain to determine which vehicle, if either, is presenting accurate information. This may result in a lower confidence measure. In some instances, multiple vehicles (e.g., Vehicles A-G) are giving the same information while Vehicle H gives different information. In such a situation, Vehicle H may be seen as an outlier, and the information from Vehicle H may be ignored or heavily discounted. Since a large number of the vehicles reinforced one another, the information from the map may still have a relatively high confidence measure, although it may be higher if all vehicles are in agreement.

If different vehicles upload different data about the same portion of the 3D map or the same vehicle uploads the different data about the same portion, then it can be determined there is a conflict arising with regards to the same portion of the map. For example, as shown in FIG. 11, the vehicles 1102 and 1103 may transmit different position data or label data with respect to the area 1101 to the remote server, causing a conflict with respect to the same area. In this case, in some embodiments, it is first determined whether the vehicle has been wrongly positioned. If it is determined that a vehicle positioning error is taking place based on, for example, reliability of GPS information, or based on the fact that the collected point cloud and the image data are quite different from the information in the map, then the remote server may discard the data collected by the vehicle at issue and assist it in relocating its position, and thereafter may remove the information regarding the conflict. However, if no obvious positioning error is found with respect to the vehicle, then all the information regarding the conflict can be retained while awaiting other vehicles upload respective data about the same portion of the 3D map.

In some cases, when the other vehicles traveling in this portion also upload the data related to this portion, the remote server may determine a degree of similarity between the respective data. Then, the remote server may improve the confidence measure of similar data and reduce the confidence measure of dissimilar data. Therefore, a higher confidence measure may be given to the similar data and a lower confidence measure may be given to the dissimilar data. As a result, the remote server may select the data with the highest confidence measure for generating the portion of the three-dimensional map and may not use data with the lowest confidence measure for generating the same portion of the three-dimensional map. In some embodiments, the data with the highest confidence measure may be fused into the previously-stored 3D map. Alternatively, in some cases, the remote server may use the dissimilar data for generating a portion of the three-dimensional map associated with a correct position of the vehicle after the vehicle positioning error of the vehicle is addressed.

Figure 12:
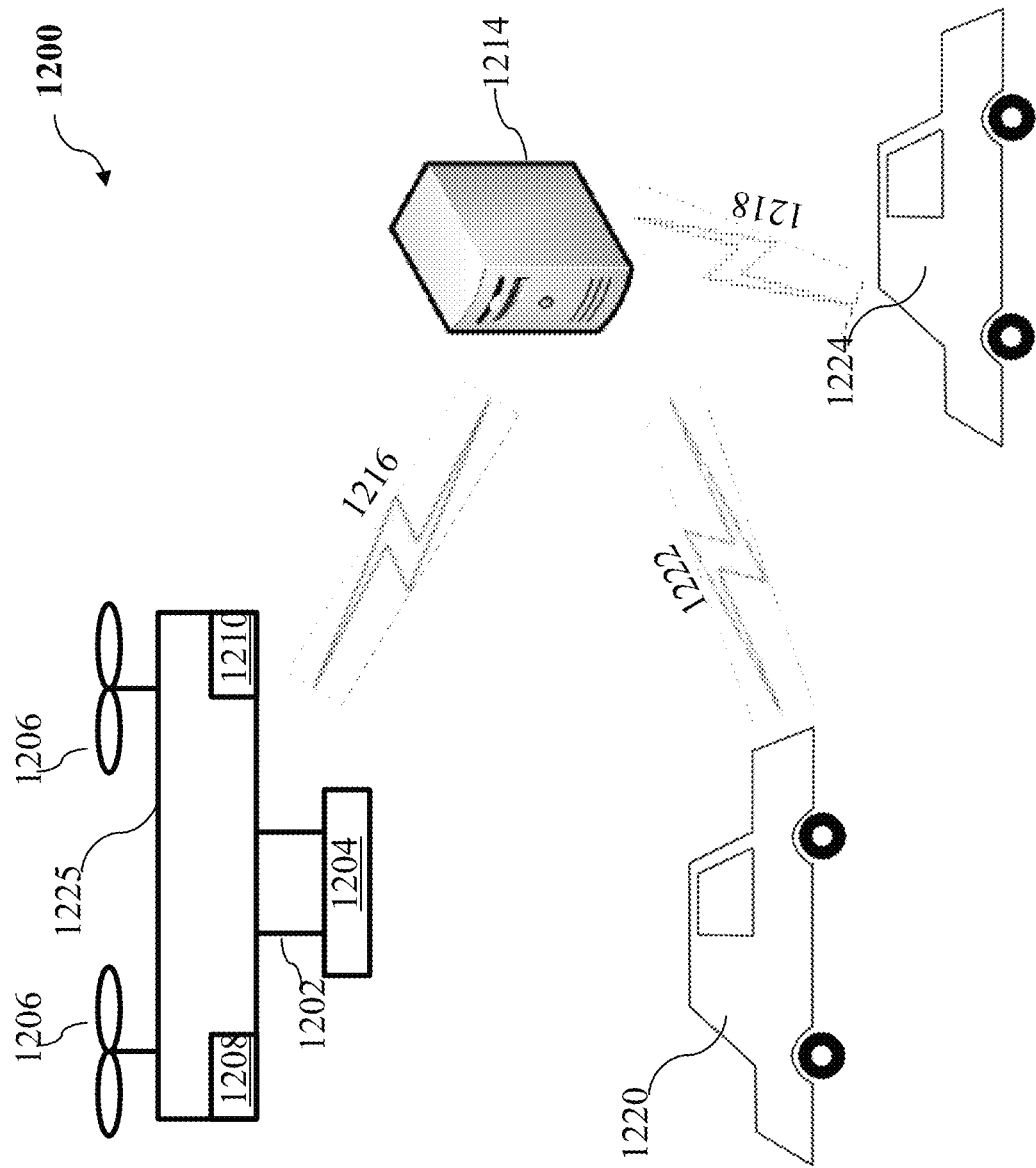
FIG. 12 illustrates a schematic diagram of data interaction between various types of vehicles and a remote server for map generation, utilization and maintenance, in accordance with embodiments of the disclosure.

FIG. 12 illustrates a schematic diagram of data interaction 1200 between various types of vehicles and a remote server for map generation, utilization and maintenance, in accordance with embodiments of the disclosure. It can be seen from FIG. 12 that the map generation system, methods and vehicles can be applied to any types of vehicles, such as ground-based vehicles 1220 and 1224, and an aerial vehicle 1225. The aerial vehicle 1225 may include propulsion mechanisms 1206, a sensing system 1208, and a communication system 1210. The sensing system herein may comprise one or more sensors capable of sensing the surrounding environment and collecting corresponding data. The communication system herein may be capable of transmitting the collected data to a remote server 1214 for generating a 3D map via a communication link 1216. In some instances, a payload 1204 may be provided on the aerial vehicle with or without requiring a carrier 1202. In some embodiments, one or more vision sensors, such as various types of cameras, can be attached to the payload 1204 for collecting image data about the surrounding environment.

The propulsion mechanisms can include one or more of rotors, propellers, blades, engines, motors, wheels, axles, magnets, or nozzles, as previously described. For example, the propulsion mechanisms may be self-tightening rotors, rotor assemblies, or other rotary propulsion units. The aerial vehicle may have one or more, two or more, three or more, or four or more propulsion mechanisms. The propulsion mechanisms may all be of the same type. Alternatively, one or more propulsion mechanisms can be different types of propulsion mechanisms. The propulsion mechanisms can be mounted on the aerial vehicle using any suitable means, such as a support element (e.g., a drive shaft). The propulsion mechanisms can be mounted on any suitable portion of the aerial vehicle, such on the top, bottom, front, back, sides, or suitable combinations thereof.

In some embodiments, the propulsion mechanisms can enable the aerial vehicle to take off vertically from a surface or land vertically on a surface without requiring any horizontal movement of the aerial vehicle (e.g., without traveling down a runway). Optionally, the propulsion mechanisms can be operable to permit the aerial vehicle to hover in the air at a specified position and/or orientation. One or more of the propulsion mechanisms may be controlled independently of the other propulsion mechanisms. Alternatively, the propulsion mechanisms can be configured to be controlled simultaneously. For example, the aerial vehicle can have multiple horizontally oriented rotors that can provide lift and/or thrust to the aerial vehicle. The multiple horizontally oriented rotors can be actuated to provide vertical takeoff, vertical landing, and hovering capabilities to the aerial vehicle. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the aerial vehicle (e.g., with respect to up to three degrees of translation and up to three degrees of rotation).

The sensing system can include one or more sensors that may sense the spatial disposition, velocity, and/or acceleration of the aerial vehicle (e.g., with respect to up to three degrees of translation and up to three degrees of rotation). The one or more sensors can include global positioning system (GPS) sensors, motion sensors, inertial sensors, proximity sensors, obstacle sensors or image sensors. The sensing data provided by the sensing system can be used to control the spatial disposition, velocity, and/or orientation of the aerial vehicle (e.g., using a suitable processing unit and/or control module, as described below). Alternatively, the sensing system can be used to provide data regarding the environment surrounding the aerial vehicle, such as weather conditions, proximity to potential obstacles, location of geographical features, location of manmade structures, and the like. In some embodiments, the obstacle avoidance operations as discussed before may be accomplished based on the data collected by the sensing system.

The communication system enables communication with a remote server having a communication system via wireless links 1216. The communication systems may include any number of transmitters, receivers, and/or transceivers suitable for wireless communication. The communication may be one-way communication, such that data can be transmitted in only one direction. For example, one-way communication may involve only the aerial vehicle transmitting data to the remote server, or vice-versa. The data may be transmitted from one or more transmitters of the communication system to one or more receivers of the remote server, or vice-versa. Alternatively, the communication may be two-way communication, such that data can be transmitted in both directions between the aerial vehicle and remote server. The two-way communication can involve transmitting data from one or more transmitters of the communication system to one or more receivers or communication units of the remote server, and vice-versa.

In some embodiments, a terminal can be provided to provide control data to one or more of the aerial vehicle, carrier, and payload and receive information from one or more of the aerial vehicle, carrier, and payload (e.g., position and/or motion information of the aerial, carrier or payload; data sensed by the payload such as image data captured by a payload camera). In some instances, control data from the terminal may include instructions for relative positions, movements, actuations, or controls of the aerial vehicle, carrier and/or payload. For example, the control data may result in a modification of the location and/or orientation of the aerial vehicle (e.g., via control of the propulsion mechanisms), or a movement of the payload with respect to the aerial vehicle (e.g., via control of the carrier). The control data from the terminal may result in control of the payload, such as control of the operation of a camera or other image capture device (e.g., taking still or moving pictures, zooming in or out, turning on or off, switching imaging modes, change image resolution, changing focus, changing depth of field, changing exposure time, changing viewing angle or field of view). In some instances, the communications from the vehicle, carrier and/or payload may include information from one or more sensors (e.g., of the sensing system or of the payload). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal can be configured to control a state of one or more of the aerial vehicle, carrier, or payload. Alternatively or in combination, the carrier and payload can also each include a communication module configured to communicate with terminal, such that the terminal can communicate with and control each of the aerial vehicle, carrier, and payload independently.

In some embodiments, the terminal may include a user interaction apparatus as discussed before for interacting with the aerial vehicle. For example, with aid of the user interaction apparatus, the terminal may receive a user input to initiate mode switching of the aerial vehicle from an autonomous mode to a semi-autonomous mode or a manually-controlled mode, thereby improving the usability and controllability of the aerial vehicle. In some embodiments, the aerial vehicle can be configured to communicate with another remote device in addition to the terminal, or instead of the terminal. The terminal may also be configured to communicate with the remote server 1214.

In some cases, the ground-based vehicles 1220 and 1224 may communicate with the remote server via the communication links 1222 and 1218 while the aerial vehicle 1225 is communicating with the remote server via the communication link 1216. According to the embodiments of the disclosure as described before, the vehicles may be capable of sensing the surrounding environment with aid of one or more sensors and collecting the data about the environment. After that, the vehicles may transmit the collected data, which may have been subject to the pre-processing via the SLAM system, to the remote server. The remote server may be able to fuse the collected data from these vehicles for generating a 3D map with high-precision or maintaining or updating a previously-stored map (or an existing map). In addition, the remote server may also transmit information, which is derived from the 3D map, to the vehicle at least for navigation of at least one vehicle. For example, the information useful for navigation of the aerial vehicle can be wirelessly transmitted to the aerial vehicle, which upon receipt thereof, may update its local map, reschedule its path planning, or change its fly trajectory. In some instances, the aerial vehicle may use the information to perform obstacle avoidance and autonomous flight.

According to the embodiments of the disclosure, by using the high-precision map, combined with high-precision positioning information, the vehicle may have more efficient information in planning path. For example, the vehicles can accurately know where the intersection is, where they are located, or when the most suitable time is for changing the lanes or slowing themselves down to take appropriate actions, thereby obtaining nearly real-time control decisions.

As the high-precision 3D map according to the embodiments of the disclosure can contains the roads, lane lines, traffic signs, traffic lights, buildings and other information, after obtaining accurate vehicle positioning, the processing of sensor data can be more targeted. For instance, the vehicle can directly filter out meaningless data or simplify the data processing. In an example, for the 3D point cloud data collected by the lidar, the information regarding the ground and the building occupies a large part of data volume. However, for obstacle avoidance and path planning, only rough information is sufficient in some cases. Therefore, with aid of the high-precision map, the processing with regards to the obstacle avoidance and path planning can be simplified. As another example, for the detection of traffic signs in the picture data, the region of interest can be better defined, thereby reducing the calculation burden. In addition, when the detection of sensors with respect to traffic signs, lanes, etc., is incorrect, the high-precision map can be used for supplementary detection so as to avoid a danger.

Figure 13:
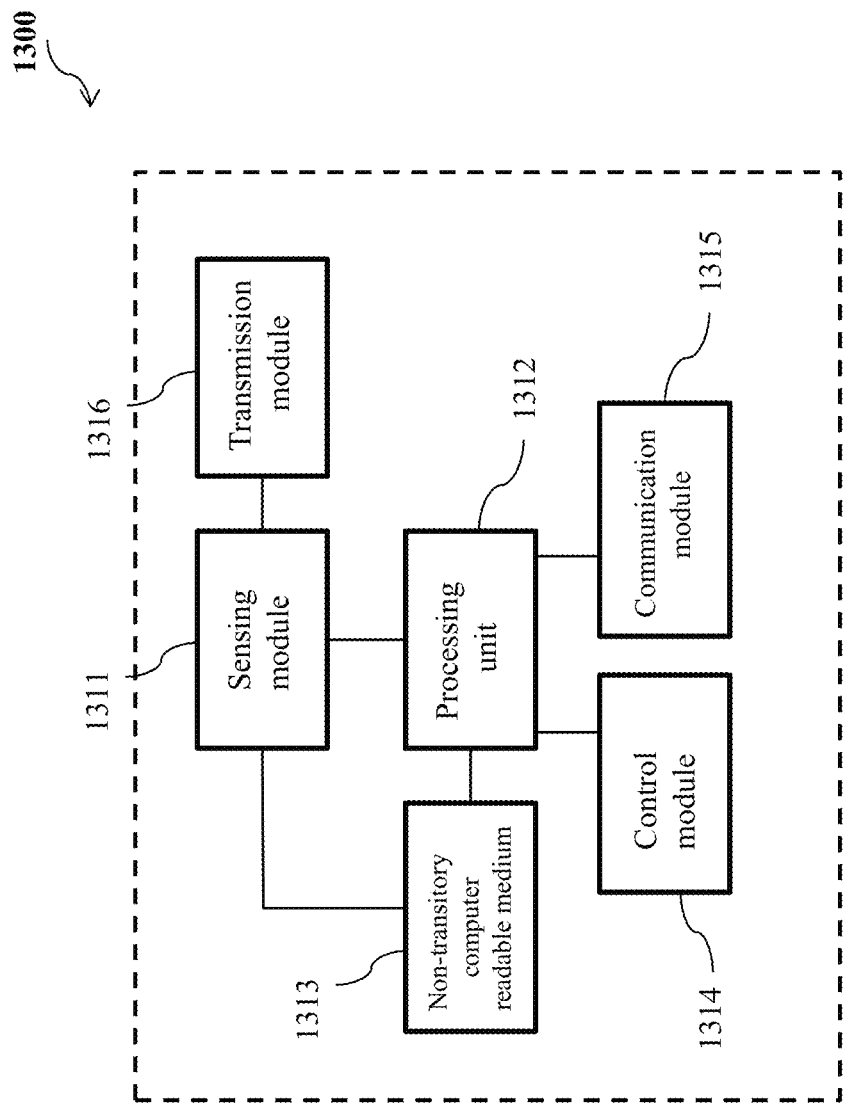
FIG. 13 provides an illustration of a block diagram for a system for map generation or helpful for navigation of a vehicle, in accordance with embodiments of the disclosure.

FIG. 13 is a schematic illustration by way of block diagram of a system 1300 for map generation or helpful for navigation of a vehicle, in accordance with embodiments of the disclosure. The system 1300 can be used in combination with any suitable embodiment of the systems, devices, vehicles and methods disclosed herein. The system 1300 can include a sensing module 1311, processing unit 1312, non-transitory computer readable medium 1313, control module 1314, communication module 1315 and transmission module 1316.

The sensing module 1311 can utilize different types of sensors that collect information relating to the surrounding environment in different ways. Different types of sensors may sense different types of signals or signals from different sources. For example, the sensors can include inertial sensors, GPS sensors, proximity sensors (e.g., lidar), or vision/image sensors (e.g., a camera, a monocular camera, a binocular camera, or an omnidirectional camera). The sensing module 1311 can be operatively coupled to a processing unit 1312 having a plurality of processors. In some embodiments, the sensing module can be operatively coupled to a transmission module 1316 (e.g., a Wi-Fi image transmission module or 4G communication module) configured to directly transmit sensing data to a suitable external device or system, e.g., a remote server or a vehicle according to the embodiments of the disclosure. For example, the transmission module 1316 can be used to transmit images captured by a camera of the sensing module 1311 to a remote server, such as a cloud server. In some cases, when the system 1300 is implemented in a vehicle, the data collected by the sensing module about the environment within which the vehicle is operating will be transmitted to the remote server for further processing, such as for map generation, update or maintain.

The processing unit 1312 can have one or more processors, such as a programmable processor (e.g., a central processing unit (CPU)). The processing unit 1312 can be operatively coupled to a non-transitory computer readable medium 1313. The non-transitory computer readable medium 1313 can store logic, code, and/or program instructions executable by the processing unit 1304 for performing one or more steps or functions as necessary for the operations of the system 1300, such as the steps shown in FIGS. 2 and 3. The non-transitory computer readable medium can include one or more memory units (e.g., removable media or external storage such as an SD card or random access memory (RAM)). In some embodiments, data from the sensing module 1311 can be directly conveyed to and stored within the memory units of the non-transitory computer readable medium 1313. For example, the data stored in the non-transitory computer readable medium may include still image and video, as well as various types of files formed by one or more sensors during the detection. The memory units of the non-transitory computer readable medium 1313 can store logic, code and/or program instructions executable by the processing unit 1312 to perform any suitable embodiment of the methods described herein. For example, the processing unit 1312 can be configured to execute instructions causing one or more processors of the processing unit 1312 to analyze sensing data produced by the sensing module and perform feature recognition and feature match, or operations associated with a SLAM system for localization and mapping for a vehicle. The memory units can store sensing data from the sensing module to be processed by the processing unit 1312. In some embodiments, the memory units of the non-transitory computer readable medium 1313 can be used to store the processing results produced by the processing unit 1312.

In some embodiments, the processing unit 1312 can be operatively coupled to a control module 1314 configured to control a state or mode of the vehicle or remote server. For instance, the control module 1314 can be configured to control the sensors on-board the vehicle to adjust scanning direction and detection range. Alternatively or in combination, the control module 1314 can control one or more of a state of one or more functional units including but not limited to sensing module.

The processing unit 1312 can be operatively coupled to a communication module 1315 configured to transmit and/or receive data from one or more external devices (e.g., a remote server). Any suitable means of communication can be used, such as wired communication or wireless communication. For example, the communication module 1315 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1315 can transmit and/or receive one or more of sensing data from the sensing module 1311, processing results produced by the processing unit 1312, pre-determined control data, user commands from a terminal or remote controller, and the like.

The components of the system 1300 can be arranged in any suitable configuration. For example, one or more of the components of the system 1300 can be located on the vehicle, sensing system, or an additional external server in communication with one or more of the above. Additionally, although FIG. 13 depicts a single processing unit 1312 and a single non-transitory computer readable medium 1313, one of skill in the art would appreciate that this is not intended to be limiting, and that the system 1300 can include a plurality of processing units and/or non-transitory computer readable media. In some embodiments, one or more of the plurality of processing units and/or non-transitory computer readable media can be situated at different locations, such as on the vehicle, terminal, sensing module, additional external device in communication with one or more of the above, or suitable combinations thereof, such that any suitable aspect of the processing and/or memory functions performed by the system 1300 can occur at one or more of the aforementioned locations.

It should be understood that the system as shown in FIG. 13 is only for illustrative purposes and should not be construed in any limiting way. The units or modules as shown in the system can be combined or replaced with other suitable units or modules, and can be omitted in view of some specific application. For example, when the system 1300 is implemented at the remote server according to the embodiments of the disclosure, the sensing module 1311 may be omitted. Further, in some embodiments, the communication module 1315 and the transmission module 1316 herein can be combined as a single module for receiving and transmitting data signals.

It should be understood from the foregoing that, while particular implementations have been illustrated and described, various modifications can be made thereto and are contemplated herein. It is also not intended that the disclosure be limited by the specific examples provided within the specification. While the disclosure has been described with reference to the aforementioned specification, the descriptions and illustrations of the embodiments herein are not meant to be construed in a limiting sense. Furthermore, it shall be understood that all aspects of the disclosure are not limited to the specific depictions, configurations or relative proportions set forth herein which depend upon a variety of conditions and variables. Various modifications in form and detail of the embodiments of the disclosure will be apparent to a person skilled in the art. It is therefore contemplated that the disclosure shall also cover any such modifications, variations and equivalents.

What is claimed is:

1. A method of map generation comprising:
   receiving data from a plurality of vehicles about environments within which the plurality of vehicles operate, wherein the data is collected by one or more sensors on-board the plurality of vehicles; and
   generating, with aid of one or more processors, a three-dimensional map using the data from the plurality of vehicles, including:
      determining and recognizing, from the data from the plurality of vehicles, dissimilar data provided by one or more vehicles of the plurality of vehicles;
      determining that one vehicle of the one or more vehicles has a vehicle positioning error, obtaining a correct position of the one vehicle by calibrating the positioning error of the one vehicle; and
      generating, using the dissimilar data, a portion of the three-dimensional map associated with the correct position of the one vehicle.

2. The method of claim 1, further comprising providing information useful for navigation to at least one vehicle of the plurality of vehicles, wherein the information is derived from the three-dimensional map.

3. The method of claim 2, wherein the information useful for navigation comprises a subset of the three-dimensional map comprising an environment within which the at least one vehicle is operating.

4. The method of claim 1, further comprising modifying a route of at least one vehicle of the plurality of vehicles to a specified destination based on the collected data or provided on the three-dimensional map.

5. The method of claim 1, wherein the three-dimensional map is generated with aid of a cloud server or is stored in memory using cloud computing infrastructure.

6. The method of claim 1, wherein the three-dimensional map comprises point cloud data.

7. The method of claim 6, further comprising projecting the point cloud data to a world coordinate system.

8. The method of claim 1, wherein the three-dimensional map further comprises image data collected by the plurality of vehicles.

9. The method of claim 1, further comprising associating a confidence measure to the data that is used for generating a portion of the three-dimensional map.

10. The method of claim 9, further comprising determining a degree of similarity between the data provided by one or more vehicles of the plurality of vehicles for generating the portion of the three-dimensional map.

11. The method of claim 9, further comprising providing a higher confidence measure to similar data and providing a lower confidence measure to the dissimilar data.

12. The method of claim 11, further comprising selecting data with a highest confidence measure for generating the portion of the three-dimensional map.

13. The method of claim 1, wherein the vehicle positioning error is detected based on reliability of Global Position System (GPS) information.

14. The method of claim 13, further comprising discarding the dissimilar data that is provided by the one vehicle having the vehicle positioning error.

15. The method of claim 1, wherein the data collected by the one or more sensors comprises label information associated with a plurality of objects in the map.

16. The method of claim 15, wherein the label information comprises class information and/or motion information associated with the plurality of objects in the three-dimensional map.

17. The method of claim 16, wherein the plurality of objects comprise dynamic objects and/or static objects.

18. The method of claim 1, further comprising:
   determining confidence measure for the data from the plurality of vehicles based on:
      at least one of a condition of each individual vehicle of the plurality of vehicles or an environment within which each individual vehicle operates; and
      comparisons among the data from the plurality of vehicles.

19. A system of generating a map comprising:
   one or more communication units; and
   one or more processors configured to:
      obtain, through the one or more communication units, data from a plurality of vehicles about environments within which the plurality of vehicles operate, wherein the data is collected by one or more sensors on-board the plurality of vehicles; and generate a three-dimensional map using the data from the plurality of vehicles, including:
    determining and recognizing, from the data from the plurality of vehicles, dissimilar data provided by one or more vehicles of the plurality of vehicles;
    determining that one vehicle of the one or more vehicles has a vehicle positioning error, obtaining a correct position of the one vehicle by calibrating the positioning error of the one vehicle; and
    generating, using dissimilar data, a portion of the three-dimensional map associated with a correct position of the one vehicle.

20. A method of map generation comprising:
receiving data from a plurality of vehicles about environments within which the plurality of vehicles operate, wherein the data is collected by one or more sensors on-board the plurality of vehicles; and
generating, with aid of one or more processors, a three-dimensional map using the data from the plurality of vehicles, including:
    associating a confidence measure to for generating a portion of the three-dimensional map;
    determining a degree of similarity between the data provided by one or more vehicles of the plurality of vehicles for generating the portion of the three-dimensional map;
    determining that one vehicle of the one or more vehicles that provides dissimilar data has a vehicle positioning error, obtaining a correct position of the one vehicle by calibrating the positioning error of the one vehicle; and
    using the dissimilar data for generating a portion of the three-dimensional map associated with the correct position of the one vehicle.

* * * * *